US012614487B2

(12) United States Patent
Kim et al.

(10) Patent No.: US 12,614,487 B2
(45) Date of Patent: Apr. 28, 2026

(54) STRETCHABLE DISPLAY DEVICE AND STRETCHABLE PANEL DRIVING CIRCUIT

(71) Applicant: LG Display Co., Ltd., Seoul (KR)

(72) Inventors: Min Kim, Paju-si (KR); SunYoon Kim, Paju-si (KR); Sanggoo Jeong, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/971,703

(22) Filed: Dec. 6, 2024

(65) Prior Publication Data

US 2025/0273108 A1 Aug. 28, 2025

(30) Foreign Application Priority Data

Feb. 23, 2024 (KR) ........................ 10-2024-0026553

(51) Int. Cl.
*G09G 3/00* (2006.01)
*G09G 3/20* (2006.01)
*G09G 3/3225* (2016.01)

(52) U.S. Cl.
CPC ........... *G09G 3/035* (2020.08); *G09G 3/2096* (2013.01); *G09G 3/3225* (2013.01); *G09G 2300/0842* (2013.01); *G09G 2320/0233* (2013.01)

(58) Field of Classification Search
CPC .... G09G 3/035; G09G 3/2096; G09G 3/3225; G09G 2300/0842; G09G 2320/0233
See application file for complete search history.

(56) References Cited

U.S. PATENT DOCUMENTS

| | | | | |
|---|---|---|---|---|
| 10,930,209 B2 * | 2/2021 | Choi | ..................... | H05K 1/0283 |
| 2020/0211437 A1 * | 7/2020 | Ahn | ..................... | G09G 3/3225 |
| 2021/0098555 A1 * | 4/2021 | Kim | ..................... | H10K 59/121 |
| 2021/0225984 A1 * | 7/2021 | Wang | ..................... | H10K 50/844 |
| 2023/0117283 A1 * | 4/2023 | Wang | ..................... | G06F 1/1652 |
| | | | | 361/679.27 |

FOREIGN PATENT DOCUMENTS

| | | | |
|---|---|---|---|
| CN | 110580870 A * | 12/2019 | ............... G09G 3/36 |
| KR | 102436553 B1 * | 8/2022 | ............... G01B 7/30 |

* cited by examiner

*Primary Examiner* — Stephen G Sherman
(74) *Attorney, Agent, or Firm* — Morgan, Lewis & Bockius LLP

(57) ABSTRACT

The present disclosure provides to a stretchable display device and a stretchable panel driving circuit, the display device including a stretchable display panel, a gate driving circuit configured to supply gate signals to pixels through gate lines, a data driving circuit, at least one stretch detection circuit group including at least one delay cell and at least one stretch variable capacitor disposed in a non-display area of the display panel, and configured to detect a delay time caused by stretch, a compensation control signal generator configured to generate a compensation control signal based on the delay time, and a timing controller configured to output a compensated signal based on the compensation control signal.

20 Claims, 19 Drawing Sheets

STRETCHABLE DISPLAY DEVICE AND STRETCHABLE PANEL DRIVING CIRCUIT

CROSS-REFERENCE TO RELATED APPLICATION

This application claims the priority benefit of Republic of Korea Patent Application No. 10-2024-0026553, filed on Feb. 23, 2024, in the Korean Intellectual Property Office, which is incorporated herein by reference for all purposes as if fully set forth herein.

BACKGROUND

Technical Field

The present disclosure relates to electronic devices with display and, more specifically, to a stretchable display device and a stretchable panel driving circuit.

Description of Related Art

As the advent of information society, there have been growing needs for display devices for displaying images. In recent years, several types of displays, such as liquid crystal displays (LCD), organic light emitting diode (OLED) displays, micro light emitting diode (LED) displays, mini light emitting diode (LED) displays, quantum dot light emitting diode (QLED) displays, and the like have been developed and increasingly used.

As display technology advances, to satisfy various needs of users, recently, flexible displays that can be bent, folded, or rolled while maintaining their performance under various deformations have been developed. In addition, there arise needs for displays that can be stretched or shrunk.

Despite the needs for such a stretchable display, as a display panel is stretched, the image quality of the display panel may become poor. Thus, challenges can arise in implementing stretchable display devices.

In particular, in the case of stretchable displays, compensation for brightness may be needed because a displayed image may become relatively dark as light emitting areas or spaces between the light emitting areas become greater.

SUMMARY

Accordingly, the present disclosure is directed to a stretchable display device and a stretchable panel driving circuit that substantially obviate one or more of the problems due to limitations and disadvantages of the related art.

To address these issues, one or more aspects of the present disclosure may provide a stretchable display device and a stretchable panel driving circuit that are capable of maintaining excellent image quality even when a display panel is stretched.

One or more aspects of the present disclosure may provide a stretchable display device and a stretchable panel driving circuit that are capable of compensating for luminance unevenness in a stretchable display panel as the display panel is stretched.

One or more aspects of the present disclosure may provide a stretchable display device and a stretchable panel driving circuit that are capable of detecting a degree to which a display panel is stretched even when a stretch detection circuit is not disposed in the display area of the display panel.

According to one or more example embodiments of the present disclosure, a stretchable display device can be provided that includes a stretchable display panel allowing a plurality of pixels and a plurality of lines to be disposed and configured to be stretchable, a gate driving circuit configured to supply gate signals to the plurality of pixels through a plurality of gate lines, a data driving circuit configured to supply data signals or compensated data signals to the plurality of pixels through a plurality of data lines, at least one stretch detection circuit group including at least one delay cell and at least one stretch variable capacitor disposed in a non-display area of the display panel, and detecting a delay time caused by stretch of the stretchable display panel, a compensation control signal generator configured to generate a compensation control signal based on the delay time, and a timing controller configured to output a compensated signal based on the compensation control signal.

According to one or more example embodiments of the present disclosure, a stretchable panel driving circuit can be provided that includes at least one stretch detection circuit group including at least one delay cell and at least one stretch variable capacitor disposed in a non-display area of a display panel, and detecting delay time caused by stretch of the display panel, a compensation control signal generator configured to generate a compensation control signal based on the delay time, and a driving circuit configured to generate a compensated signal based on the compensation control signal.

According to one or more aspects of the present disclosure, a stretchable display device and a stretchable panel driving circuit may be provided that are capable of maintaining excellent image quality even when a display panel is stretched.

According to one or more aspects of the present disclosure, a stretchable display device and a stretchable panel driving circuit may be provided that are capable of compensating for luminance unevenness in a stretchable display panel as the display panel is stretched.

Additional features and aspects of the disclosure will be set forth in the description that follows and in part will become apparent from the description or may be learned by practice of the inventive concepts provided herein. Other features and aspects of the inventive concepts may be realized and attained by the structure particularly pointed out in, or derivable from, the written description, claims hereof, and the appended drawings.

It is to be understood that both the foregoing general description and the following detailed description of the present disclosure are by way of example and are intended to provide further explanation of the disclosures as claimed.

BRIEF DESCRIPTION OF THE DRAWINGS

The accompanying drawings, which are included to provide a further understanding of the disclosure and are incorporated in and constitute a part of the disclosure, illustrate aspects of the disclosure and together with the description serve to explain principles of the disclosure. In the drawings.

DETAILED DESCRIPTION

Figure 1:
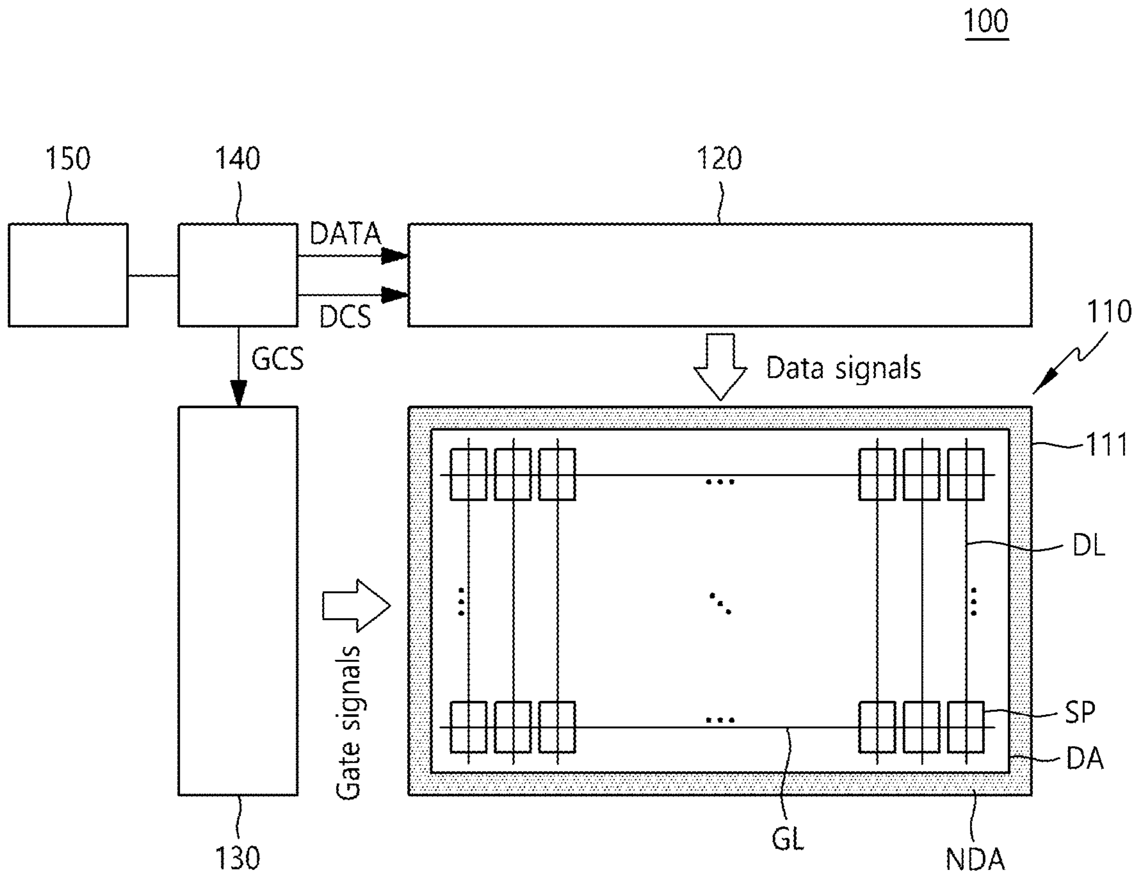
FIG. 1 illustrates the configuration of an example display device according to aspects of the present disclosure.

Reference will now be made in detail to example embodiments of the present disclosure, examples of which may be illustrated in the accompanying drawings.

In the following description, the structures, embodiments, implementations, methods and operations described herein are not limited to the specific example or examples set forth herein and may be changed as is known in the art, unless otherwise specified. Like reference numerals designate like elements throughout, unless otherwise specified. Names of the respective elements used in the following explanations are selected only for convenience of writing the specification and may thus be different from those used in actual products.

Advantages and features of the present disclosure, and implementation methods thereof will be clarified through following example embodiments described with reference to the accompanying drawings. The present disclosure may, however, be embodied in different forms and should not be construed as limited to the example embodiments set forth herein. Rather, these example embodiments are provided so that this disclosure may be sufficiently thorough and complete to assist those skilled in the art to fully understand the scope of the present disclosure. Further, the protected scope of the present disclosure is defined by claims and their equivalents.

In the following description, where the detailed description of the relevant known function or configuration may unnecessarily obscure aspects of the present disclosure, a detailed description of such known function or configuration may be omitted.

The shapes, sizes, ratios, angles, numbers, and the like, which are illustrated in the drawings to describe various example embodiments of the present disclosure, are merely given by way of example. Therefore, the present disclosure is not limited to the illustrations in the drawings.

Where a term like "include," "have," "contain," "constitute," "make up of," or "formed of" is used, one or more other elements may be added unless the term is used with a more limiting term, such as "only." An element described in a singular form may include a plurality of elements, and vice versa, unless the context clearly indicates otherwise.

Although terms "first," "second," "A," "B," "(A)," "(B)," and the like may be used herein to describe various elements, these elements should not be interpreted to be limited by these terms as they are not used to define a particular essence, order, sequence, precedence, or number of such elements. These terms are used only to refer to one element separately from another. For example, a first element could be termed a second element, and a second element could similarly be termed a first element, without departing from the scope of the present disclosure.

When it is mentioned that a first element "is connected or coupled to", "contacts or overlaps" a second element, or the like, it should be interpreted that, not only can the first element "be directly connected or coupled to" or "directly contact or overlap" the second element, but a third element can also be "interposed" between the first and second elements, or the first and second elements can "be connected or coupled to" or "contact or overlap" each other via a fourth element. Here, the second element may be included in at least one of two or more elements that "are connected or coupled to" or "contact or overlap" each other.

Where time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the terms are used with a more limiting term like "directly" or "immediately."

In addition, where any dimensions, relative sizes, and the like are described, it should be considered that numerical values for an elements or features, or corresponding information (e.g., level, range, etc.) include a tolerance or error range that may be caused by various factors (e.g., process factors, internal or external impact, noise, etc.) even when a relevant description is not specified.

In construing an element, the element is to be construed as including an error or tolerance range even where no explicit description of such an error or tolerance range is provided.

Further, the term "may" fully encompasses all the meanings of the term "can." The term "at least one" should be understood as including any or all combinations of one or more of the associated listed items. For example, the meaning of "at least one of a first element, a second element, and a third element" encompasses the combination of all three listed elements, combinations of any two of the three elements, as well as each individual element, the first element, the second element, and the third element.

The expression of a first element, a second elements "and/or" a third element should be understood as one of the first, second and third elements or as any or all combinations of the first, second and third elements. By way of example, A, B and/or C can refer to only A, only B, or only C; any or some combination of A, B, and C; or all of A, B, and C. Hereinafter, various example embodiments of the present disclosure will be described in detail with reference to the accompanying drawings.

In addition, for convenience of description, a scale in which each of elements is illustrated in the accompanying drawings may differ from an actual scale. Thus, the illustrated elements are not limited to the specific scale in which they are illustrated in the drawings.

Hereinafter, various example embodiments of the present disclosure will be described in detail with reference to the accompanying drawings.

FIG. 1 illustrates an example system configuration of a display device 100 according to aspects of the present disclosure.

As shown in FIG. 1, in one or more example embodiments, the display device 100 may include a display panel 110 and a display driving circuit as components for displaying an image. The display driving circuit may be a circuit for driving the display panel 110, and include a data driving circuit 120, a gate driving circuit 130, a controller 140, and other circuit components.

The display panel 110 may include a substrate 111 and a plurality of subpixels SP disposed on the substrate 111.

The substrate 111 of the display panel 110 may include a display area DA allowing an image to be displayed and a non-display area NDA located outside of the display area DA.

In one or more aspects, the display panel 110 may be configured to have a very small non-active area NA.

For example, the non-display area NDA may include a first non-display area located outside of the display area DA in a first direction, a second non-display area located outside of the display area DA in a second direction intersecting the first direction, a third non-display area located outside of the display area DA in a direction opposite to the first direction, and a fourth non-display area located outside of the display area DA in a direction opposite to the second direction. One or two non-display areas among the first to fourth non-display areas may include a pad area to which the data driving circuit 120 is connected or bonded. For example, among the first to fourth non-display areas, each of the remaining two or three non-display areas, which do not include the pad area, may have a very small size compared with the one or two non-display areas.

In another example, a boundary area between the display area DA and the non-display area NDA may be bent, and thereby, the non-display area NDA may be located under the display area DA. In this example, when a user views the display device 100 in front thereof, all or most of the non-display area NDA may not be visible to the user.

Various types of signal lines for driving a plurality of subpixels SP may be disposed on the substrate 111 of the display panel 110.

The display device 100 according to aspects of the present disclosure may be a liquid crystal display device, or the like, or a self-emission display device in which light is emitted from the display panel 110 itself. In an example where the display device 100 according to aspects of the present disclosure is the self-emission display device, each of the plurality of subpixels SP may include a light emitting element.

For example, the display device 100 according to aspects of the present disclosure may be an organic light emitting display device implemented with organic light emitting diodes (OLED) as light emitting elements. In another example, the display device 100 according to aspects of the present disclosure may be an inorganic light emitting display device implemented with inorganic material-based light emitting diodes as light emitting elements. In further another example, the display device 100 according to aspects of the present disclosure may be a quantum dot display device implemented with quantum dots, which are self-emission semiconductor crystals, as light emitting elements.

The structure of each of the plurality of subpixels SP may depend on types of display device 100. For example, in an example where the display device 100 is a self-emission display device including self-emission subpixels SP, each subpixel SP may include a self-emission light emitting element, one or more transistors, and one or more capacitors.

The various types of signal lines may include, for example, a plurality of data lines DL for carrying data signals (which may be referred to as data voltages or image signals), a plurality of gate lines GL for carrying gate signals (which may be referred to as scan signals), and the like.

In one or more aspects, the plurality of data lines DL and the plurality of gate lines GL may intersect one another. For example, each data line DL may intersect each gate line GL at a certain angle to the gate line GL. Each of the plurality of data lines DL may be disposed while extending in a first direction, and each of the plurality of gate lines GL may be disposed while extending in a second direction. For example, the first direction may be a column or vertical direction, and the second direction may be a row or horizontal direction. In another example, the first direction may be the row or horizontal direction, and the second direction may be the column or vertical direction. Hereinafter, for convenience of explanation, discussions may be provided based on examples where each of a plurality of data lines DL is disposed in the column direction, and each of a plurality of gate lines GL is disposed in the row direction, but embodiments of the present disclosure are limited thereto.

The data driving circuit 120 may be a circuit for driving a plurality of data lines DL and can output data signals to the plurality of data lines DL.

The data driving circuit 120 can receive image data DATA in digital form from the display controller 140, convert the received image data DATA into data signals in analog form, and output converted data signals to the plurality of data lines DL.

In one or more aspects, the data driving circuit 120 may be connected to the display panel 110 by a tape-automatedbonding (TAB) technique, or connected to a conductive pad such as a bonding pad of the display panel 110 by a chip-on-glass (COG) technique or a chip-on-panel (COP) technique, or connected in the display panel 110 by a chip-on-film (COF) technique.

In one or more aspects, the data driving circuit 120 may be located in, and/or electrically connected to, but not limited to, only one side or portion (e.g., an upper edge or a lower edge) of the display panel 110. In one or more aspects, the data driving circuit 120 may be disposed in, and/or electrically connected to, but not limited to, two sides or portions (e.g., an upper edge and a lower edge) of the display panel 110 or at least two of four sides or portions (e.g., the upper edge, the lower edge, a left edge, and a right edge) of the display panel 110 according to driving schemes, panel design schemes, or other design requirements.

The data driving circuit 120 may be connected to outside, or an edge, of the display area DA of the display panel 110, or be disposed in the display area DA of the display panel 110.

The gate driving circuit 130 may be a circuit for driving a plurality of gate lines GL and can output gate signals to the plurality of gate lines GL. The gate driving circuit 130 can receive various types of gate driving control signals GCS, and further, receive a first gate voltage corresponding to a turn-on level voltage and a second gate voltage corresponding to a turn-off level voltage. Thereby, the gate driving circuit 130 can generate gate signals and supply the generated gate signals to the plurality of gate lines GL.

In one or more aspects, the gate driving circuit 130 included in the display device 100 may be embedded into the display panel 110 by a gate-in-panel (GIP) technique. In an example where the gate driving circuit 130 is implemented by the gate-in-panel (GIP) technique, the gate driving circuit 130 may be disposed on the substrate 111 of the display panel 110 during the manufacturing process of the display panel 110 or display device 100. In one or more aspects, the gate driving circuit 130 included in the display device 100 may be disposed in the display area DA of the display panel 110. In this implementation, for example, the gate driving circuit 130 may be disposed in, and/or electrically connected to, but not limited to, a first area (e.g., a left area or a right area) of the display area DA of the display panel 110. In another example, the gate driving circuit 130 may be disposed in, and/or electrically connected to, but not limited to, a first area (e.g., a left area or a right area) and a second area (e.g., the right area or the left area) of the display area DA of the display panel 110.

Herein, the gate driving circuit 130 embedded in the display panel 110 by the gate-in-panel (GIP) technique may also be referred to as a "gate-in-panel circuit."

The timing controller 140 may be a device for controlling the data driving circuit 120 and the gate driving circuit 130, and can control driving timing for the plurality of data lines DL and driving timing for the plurality of gate lines GL.

The timing controller 140 can supply a data driving control signal DCS to the data driving circuit 120 to control the data driving circuit 120, and supply a gate driving control signal GCS to the gate driving circuit 130 to control the gate driving circuit 130.

The timing controller 140 can receive image data input from a host system 150 and supply image data DATA readable by the data driving circuit 120 based on the input image data to the data driving circuit 120.

The timing controller 140 may be implemented in a separate component from the data driving circuit 120, or incorporated in the data driving circuit 120 and thus implemented in an integrated circuit.

The timing controller 140 may be a timing controller used in the typical display technology or a controller or a control device capable of performing other control functions in addition to the function of the typical timing controller. In one or more embodiments, the display controller 140 may be a controller or a control device different from the timing controller, or a circuitry or a component included in the controller or the control device. The timing controller 140 may be implemented using various circuits or electronic components such as an integrated circuit (IC), a field programmable gate array (FPGA), an application specific integrated circuit (ASIC), a processor, and/or the like.

The timing controller 140 may be mounted on a printed circuit board, a flexible printed circuit, and/or the like and be electrically connected to the gate driving circuit 130 and the data driving circuit 120 through the printed circuit board, flexible printed circuit, and/or the like.

The timing controller 140 can transmit signals to, and receive signals from, the data driving circuit 120 via one or more predetermined interfaces. For example, such interfaces may include a low voltage differential signaling (LVDS) interface, an embedded clock point-point interface (EPI), a serial peripheral interface (SPI), and the like. However, example embodiments of the present disclosure are not limited thereto.

In one or more aspects, to provide a touch sensing function, as well as an image display function, the display device 100 may include a touch sensor, and a touch sensing circuit configured to sense the touch sensor and detect whether a touch is applied by an object such as a finger, a pen, or the like, or a location of the touch (or touch coordinates).

The touch sensing circuit may include a touch driving circuit configured to drive and sense the touch sensor and generate and output touch sensing data, and a touch controller capable of detecting whether a touch is applied or a location (or touch coordinates) of the touch using the touch sensing data.

The touch sensor may include a plurality of touch electrodes. The touch sensor may further include a plurality of touch lines to electrically connect the plurality of touch electrodes to the touch driving circuit.

The touch sensor may be implemented in the form of a touch panel outside of the display panel 110 or be integrated inside of the display panel 110. In the example where the touch sensor is implemented in the form of the touch panel outside of the display panel 110, such a touch sensor may be referred to as an add-on type. In the example where the add-on type of touch sensor is disposed in the display device 100, the touch panel and the display panel 110 may be separately manufactured and combined in an assembly process. The add-on type of touch panel may include a touch panel substrate and a plurality of touch electrodes disposed on the touch panel substrate.

In the example where the touch sensor is disposed inside of the display panel 110, the touch sensor may be formed on the substrate along with signal lines and electrodes related to display driving during the manufacturing process of the display panel 110.

The touch driving circuit can supply a touch driving signal to at least one of a plurality of touch electrodes and generate touch sensing data by sensing at least one of the plurality of touch electrodes.

The touch sensing circuit can perform touch sensing by a self-capacitance sensing technique or a mutual-capacitance sensing technique.

In the example where the touch sensing circuit performs touch sensing by the self-capacitance sensing technique, the touch sensing circuit can perform touch sensing based on capacitance between each touch electrode and a touch object (e.g., a finger, a pen, and the like). According to the self-capacitance sensing technique, each of a plurality of touch electrodes can serve as both a driving touch electrode and a sensing touch electrode. The touch driving circuit may drive all, or one or more, of a plurality of touch electrodes and sense all, or one or more, of the plurality of touch electrodes.

In the example where the touch sensing circuit performs touch sensing by the mutual-capacitance sensing technique, the touch sensing circuit can perform touch sensing based on a capacitance between touch electrodes. According to the mutual-capacitance sensing technique, a plurality of touch electrodes may be divided into driving touch electrodes and sensing touch electrodes. The touch driving circuit can drive the driving touch electrodes and sense the sensing touch electrodes.

In one or more aspects, the touch driving circuit and touch controller included in the touch sensing circuit may be implemented in separate devices or in a single device. In one or more aspects, the touch driving circuit and the data driving circuit may be implemented in separate devices or in a single device.

The display device 100 may further include a power supply circuit for supplying various types of power to the display driving circuit and/or the touch sensing circuit. In one or more aspects, the display device 100 may represent, but not limited to, a mobile terminal, such as a smart phone, a tablet, or the like, a monitor, a television (TV), or the like. Example embodiments of the present disclosure are not limited thereto. In one or more aspects, the display device 100 may be display devices, or include displays, of various types, sizes, and shapes for displaying information or images.

In one or more example embodiments, the display device 100 may further include an electronic device such as a camera (e.g., an image sensor), a sensor capable of detecting an object, and the like. For example, the sensor may be a sensor capable of detecting an object or a human body by receiving light such as infrared light, ultrasonic light, ultraviolet light or the like.

Figure 2:
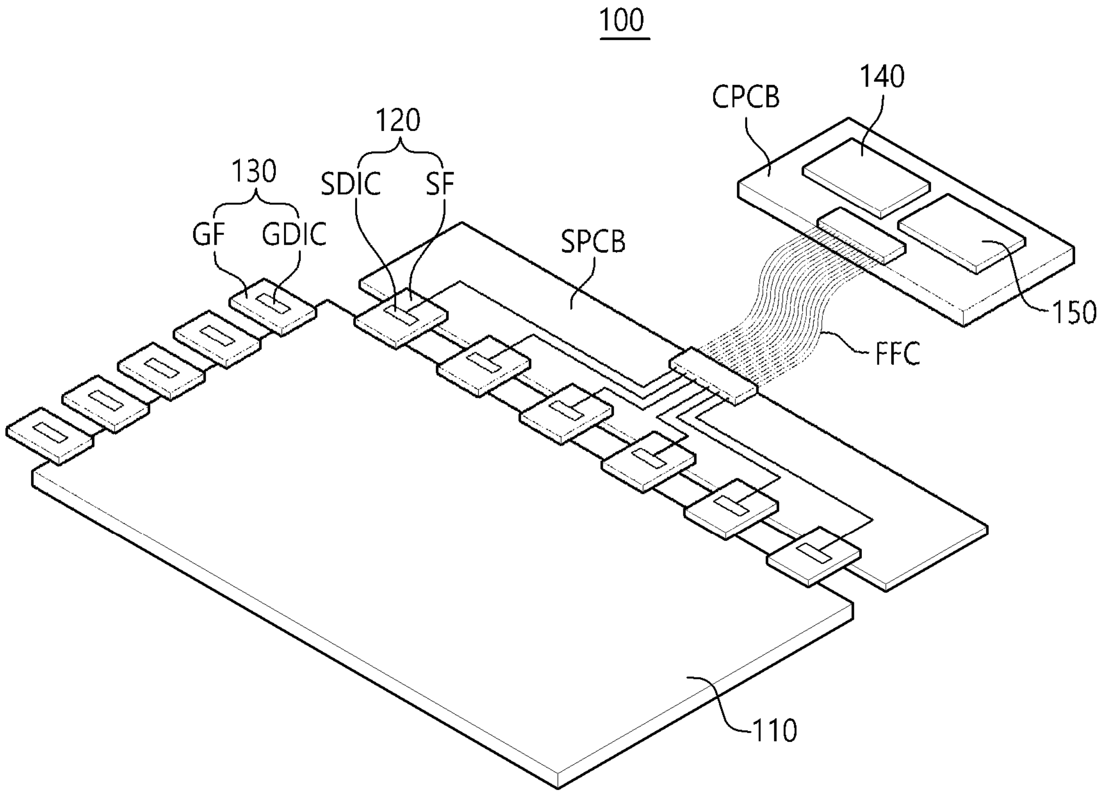
FIG. 2 illustrates an example schematic configuration of the display device according to aspects of the present disclosure.

FIG. 2 illustrates an example schematic configuration of the display device 100 according to aspects of the present disclosure.

As shown in FIG. 2, in one or more example embodiments, the display device 100 may be configured with a structure where one or more source driver integrated circuits SDIC included in the data driving circuit 120 and one or more gate driver integrated circuits GDIC included in the gate driving circuit 130 are implemented using the chip-on-film (COF) technique among various techniques (the TAB, the COG, the COF, and the like).

Each of one or more gate driver integrated circuits GDIC included in the gate driving circuit 130 may be mounted on a respective gate film GF, and one side of each of the gate films GF may be electrically connected to the display panel 110. In one or more aspects, lines for electrically connecting a corresponding gate driver integrated circuit GDIC to the display panel 110 may be disposed on each gate film GF.

In this implementation, the gate driving circuit 130 may be located in only one side or portion (e.g., a left edge, a right edge, an upper edge, a lower edge, or the like), or in two sides or portions (e.g., a left edge and a right edge, an upper edge and a lower edge, or the like) of the display panel 110 according to design requirements. In one or more aspects, the gate driving circuit 130 may be embedded in a bezel area of the display panel 110, and be implemented in the gate-in-panel (GIP) type.

Each of one or more source driver integrated circuits SDIC included in the data driving circuit 120 may be mounted on a respective source film SF, and a first side of each source film SF may be electrically connected to the display panel 110. In one or more aspects, lines for electrically connecting a corresponding source driver integrated circuit SDIC to the display panel 110 may be disposed on each source film SF.

The display device 100 may include one or more printed circuit boards for circuit connection between one or more source driver integrated circuits SDIC and one or more other components or devices. The printed circuit boards may include, for example, at least one source printed circuit board SPCB, a control printed circuit board CPCB on which control components and various electrical devices are mounted, and the like.

In one or more aspects, a second opposing side of each source film SF on which a corresponding source driver integrated circuit SDIC is mounted may be connected to a source printed circuit board SPCB. For example, the first side of each source film SF on which a corresponding source driver integrated circuit SDIC is mounted may be electrically connected to the display panel 110, and the second opposing side of each source film SF may be electrically connected to a source printed circuit board SPCB.

The controller 140, a power management circuit (e.g., a power management IC, 150), and the like may be mounted on the control printed circuit board CPCB. The controller 140 can control operations of the data driving circuit 120 and the gate driving circuit 130. The power management circuit 150 can supply power (e.g., various levels of driving voltages or various amounts of current) to the display panel 110, the data driving circuit 120, the gate driving circuit 130, and the like, and control a voltage level or a current amount supplied thereto.

In one or more aspects, the at least on source printed circuit board SPCB and the control printed circuit board CPCB may be electrically connected to each other through at least one connector, such as a flexible printed circuit FPC, a flexible flat cable FFC, and/or the like.

The at least one connector for electrically interconnecting the at least on source printed circuit board SPCB and the control printed circuit board CPCB may be variously designed or defined depending on sizes and types of the display device 100. In one or more aspects, the at least one source printed circuit board SPCB and the control printed circuit board CPCB may be integrated into one printed circuit board.

In one or more aspects, the power management circuit 150 included in the display device 100 can supply a driving voltage required for display driving or characteristic value sensing to a source printed circuit board SPCB through a flexible printed circuit FPC or a flexible flat cable FFC. The driving voltage delivered to the source printed circuit board SPCB can be supplied to the display panel 110 through a source driver integrated circuit SDIC, this enabling at least on subpixel SP to be driven for emitting light or to be sensed.

Figure 3:
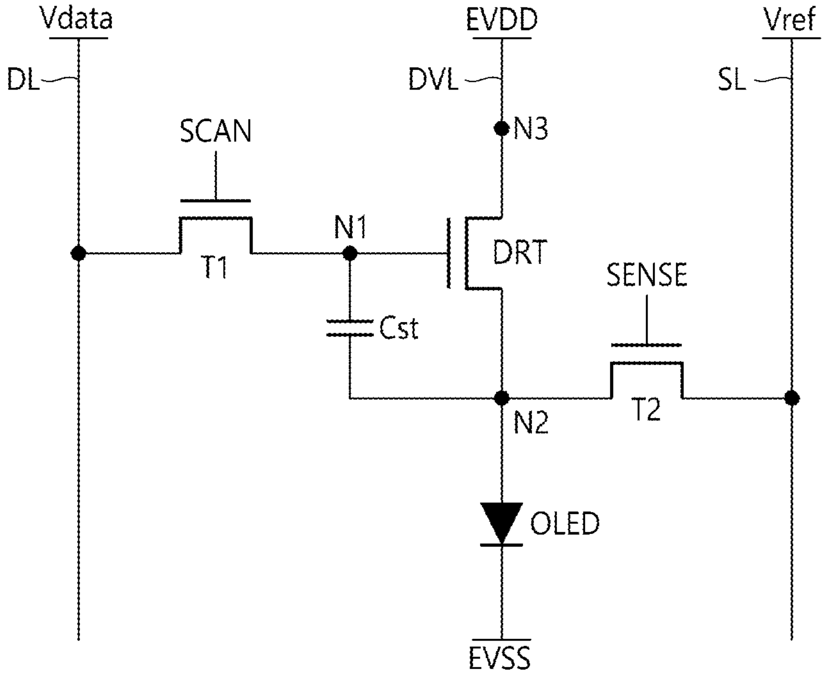
FIG. 3 illustrates an example configuration of a subpixel SP included in the display panel according to aspects of the present disclosure.

FIG. 3 illustrates an example configuration of a subpixel SP included in the display panel 110 in an example where the display panel 110 is an organic light emitting display panel according to aspects of the present disclosure.

As shown in FIG. 3, in one or more example embodiments, each of subpixels SP disposed in the display panel 110 may include a light emitting element, such as an OLED, a micro LED, a mini LED, a QLED, and the like, a driving transistor DRT configured to drive the light emitting element, a first transistor T1 configured to pass a data voltage Vdata to a first node N1, which is the gate node of the driving transistor DRT, a storage capacitor Cst configured to maintain a voltage during one frame period, and the like.

In an example where the light emitting element is implemented as an organic light emitting diode OLED, the organic light emitting diode OLED may include an anode electrode, an organic emission layer, a cathode electrode, and the like. For example, the first electrode may be an anode electrode. The second electrode may be a cathode electrode to which a cathode voltage EVSS is applied. In another example, the first electrode may be a cathode electrode, and the second electrode may be an anode electrode. The driving transistor DRT may be electrically connected between the first electrode of the organic light emitting diode OLED and a driving voltage line DVL.

The first node N1 of the driving transistor DRT may be the gate node, and be electrically connected to the source node or drain node of the first transistor T1. A data voltage Vdata may be applied to the first node N1 of the driving transistor DRT. A second node N2 of the driving transistor DRT may be a source node or a drain node, and be electrically connected to the first electrode of the organic light emitting diode OLED. A third node N3 of the driving transistor DRT may be electrically connected to a driving voltage line DVL. The first transistor T1 may be controlled by a first scan signal SCAN1 delivered through a gate line GL, and be electrically connected between the gate node N1 of the driving transistor DRT and the data line DL. When the first transistor T1 is turned on, the first transistor T1 can pass a data voltage Vdata delivered through the data line DL to the first node N1, which is the gate node of the driving transistor DRT. The storage capacitor Cst may be electrically connected between the first node N1 and the second node N2 of the driving transistor DRT. A plurality of lines SL disposed in the display panel 110 may include at least one data line DL, at least one driving voltage line DVL, and at least one gate line GL. For example, one or more of the at least one data line DL, the at least one driving voltage line DVL, and the at least one gate line GL may be stretchable lines SL. Each subpixel SP included in the display panel 110 may include two transistors (2T: DRT and T1) and one capacitor (1C: Cst) (which may be referred to as a "2T1C structure") as shown in FIG. 3. In some implementations, each subpixel SP included in the display panel 110 may further include one or more transistors, or further include one or more capacitors.

For example, as shown in FIG. 3, each subpixel SP may further include a second transistor T2 controlled by a second scan signal SCAN2 and electrically connected between the second node N2 of the driving transistor DRT and a reference voltage line RVL. As shown in FIG. 3, the first scan signal SCAN1 and the second scan signal SCAN2 may be delivered through different gate lines GL or may be delivered through the same gate line GL.

Figure 4:
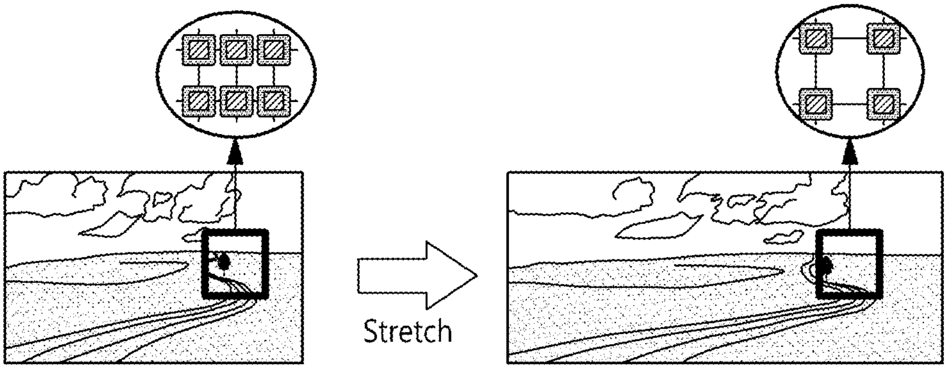
FIG. 4 illustrates an example situation where a displayed image becomes relatively dark as light emitting areas or spaces between the light emitting areas become greater when the display device is stretched in an example where the display device is a stretchable display device according to aspects of the present disclosure.

FIG. 4 illustrates an example situation where a displayed image becomes relatively dark as light emitting areas or spaces between the light emitting areas become greater when a stretchable display device is stretched in an example where the display device 100 is implemented as the stretchable display device according to aspects of the present disclosure.

As shown in FIG. 4, in one or more example embodiments, the display device 100 may be a stretchable display device. To enable the display device 100 to have stretchability, elasticity, or flexibility, it is necessary for the display panel 110, which is a major component of the display device 100, to have stretchability, elasticity, or flexibility.

For the stretchability of the display panel 110, a substrate SUB may be include a stretchable material. For example, a material included in the stretchable substrate SUB may include one or more of urethane acrylate, epoxy acrylate, polydimethylsiloxane (PDMS), thermoplastic polyurethane (TPU), and the like.

In one or more aspects, for the stretchability of the display panel 110, all components (e.g., one or more electrodes, one or more lines, one or more circuit elements, and the like) disposed on the substrate SUB may be required to have stretchability, or one or more components (one or more lines, and the like) may be required to have stretchability.

For example, for the stretchability of the display panel 110, a plurality of lines SL disposed on the substrate SUB may be required to include a material capable of being stretched. A material included in the stretchable line SL may include, for example, a mixture of silver nanopowder (AgNP) or silver nanowire and a rubber material.

For example, a level (or a degree) of the stretchability of the display panel 110 may be determined depending on a ratio of components having stretchability to all components (e.g., one or more electrodes, one or more lines, one or more circuit elements, and the like) disposed on the substrate SUB.

Herein, the stretchability of the display panel 110 may mean that the display panel 110 can be stretched or shortened in a length direction and/or a width direction of the display panel 110. For example, the stretchability of the display panel 110 may mean that the display panel 110 is flexible, rollable, or foldable.

In one or more aspects, the display panel 110 may have stretchability in all locations or all areas, or have stretchability only in specific locations or specific areas. In one or more aspects, the display panel 110 may have stretchability in all directions or only in a specific direction. In one or more aspects, the display panel 110 may have the same degree of stretchability, or may have a different degree of stretchability at a specific location, a specific area, or in a specific direction comparing with the remaining one or more locations, areas, or directions.

When the display panel 110 is stretched, as lines disposed in the display panel and lines of subpixels are also stretched, an image presented in the display area DA may become dark, and therefore, compensation for brightness or luminance may be needed.

Figure 5A:
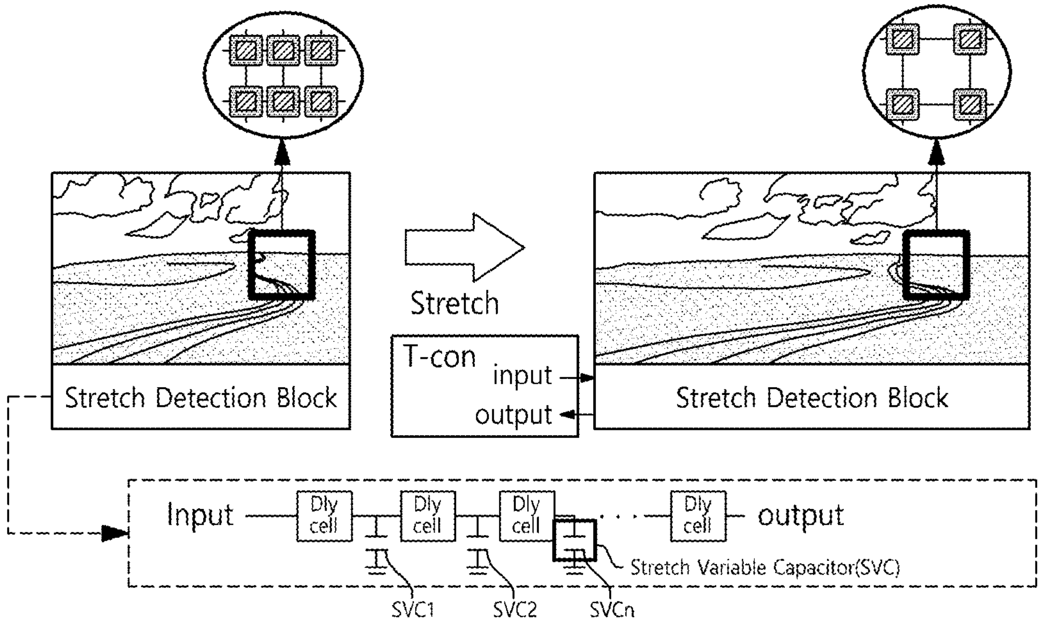
FIGS. 5A, 5B, and 5C schematically illustrate an example stretch detection circuit for detecting a degree to which the display panel is stretched according to aspects of the present disclosure.
Figure 5B:
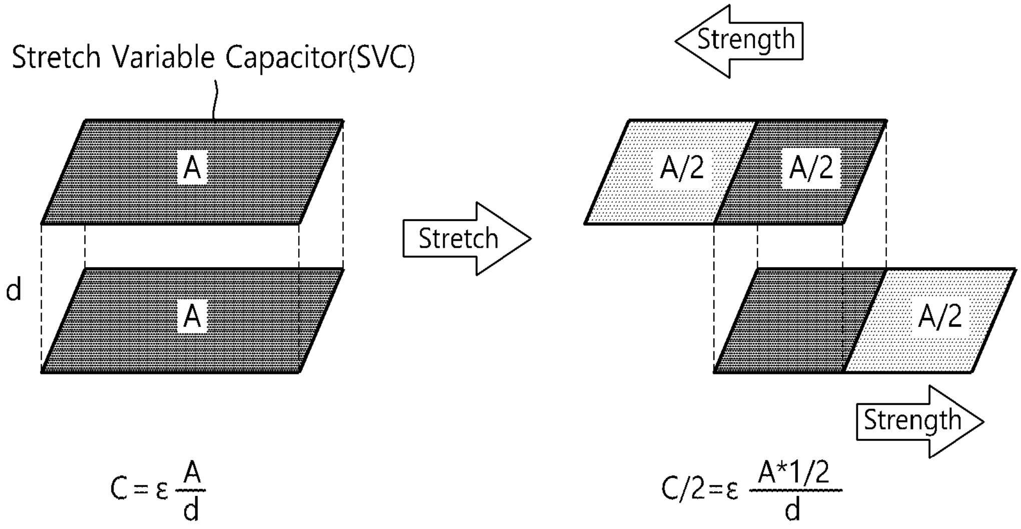
Figure 5C:
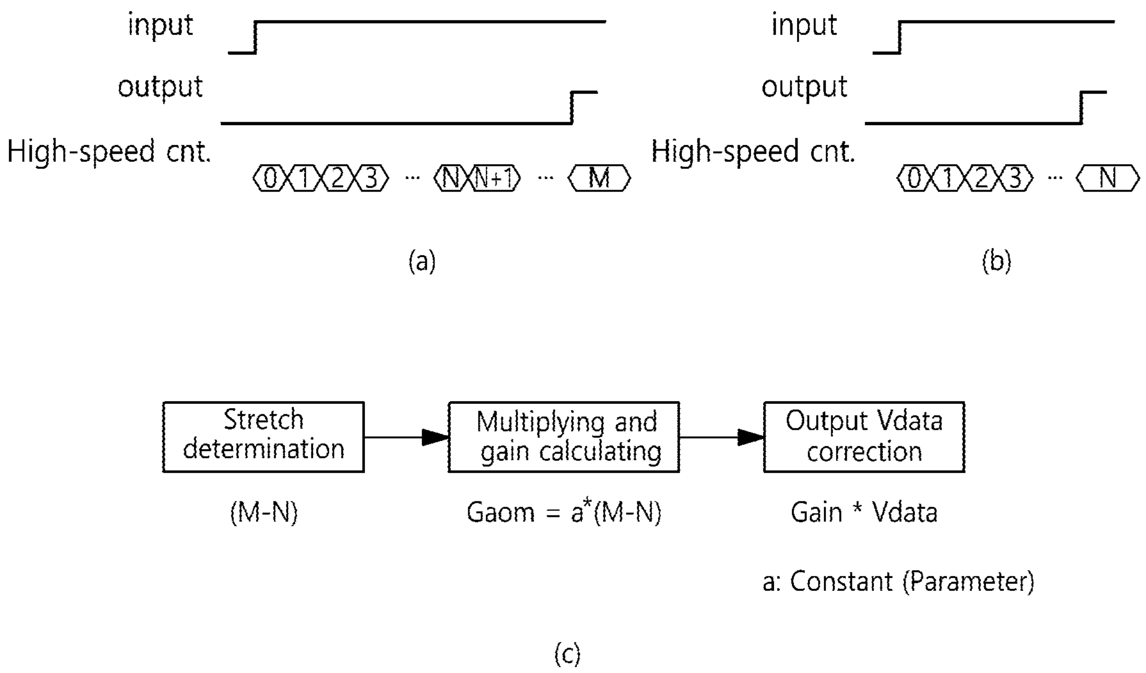

FIGS. 5A to 5C illustrate an example in which a delay time measured by a stretch detection circuit is reduced when the display panel 110 is stretched.

In one or more example embodiments, FIG. 5A schematically illustrates the configuration of an example stretch detection circuit configured to detect whether the display panel 110 is stretched, and detect a degree of the stretch of the display panel 110.

As shown in FIG. 5A, the stretch detection circuit may include at least one stretch variable capacitor SVC and at least one delay cell (Dly cell). For example, a delay cell (Dly cell) may be connected between adjacent stretch variable capacitors SVC. In one or more aspects, the at least one stretch variable capacitor SVC may include a plurality of stretch variable capacitors SVC, and the at least one delay cell (Dly cell) may include a plurality of delay cells (Dly cell). For example, each stretch variable capacitors SVC and each delay cells (Dly cell) may form a stretch detection cell pair. In this manner, the plurality of delay cells and the plurality of stretch variable capacitors may form a plurality of stretch detection cell pairs, respectively, and the plurality of stretch detection cell pairs may be connected to each other in series such that the plurality of delay cells are connected to each other in series, and the plurality of stretch variable capacitors are connected in parallel to one or more adjacent delay cells.

A voltage signal with a preset voltage may be input to an input terminal of the stretch detection circuit. For example, a voltage signal of about 1.8V may be input to the input terminal of the stretch detection circuit.

For example, each delay cell (Dly cell) may be configured with an inverter gate, a buffer, a resistor, and the like. In this example, when a voltage signal (input voltage) from a preceding delay cell (Dly cell) or a driver (e.g., the data driving circuit 120) is applied to a stretch variable capacitor SVC connected to a delay cell (Dly cell), the stretch variable capacitor SVC can store the applied voltage, and when the stretch variable capacitor SVC completes the storing, the stored voltage can be applied to a next delay cell (Dly cell) connected to the stretch variable capacitor SVC. In this manner, after the voltage signal (the input voltage) is applied to the input terminal of the stretch detection circuit, an output signal (output voltage) can be provided by an output terminal of the stretch detection circuit by sequentially passing through the plurality of stretch detection cells (the plurality of stretch detection cell pairs).

FIG. 5B schematically illustrates a situation where the capacitance of a stretch variable capacitor SVC is changed by stretch.

As shown in FIG. 5B, in one or more aspects, when the display panel 110 is stretched, as an area where an upper electrode and a lower electrode face each other are deformed, there may be caused a change in the capacitance of a corresponding stretch variable capacitor SVC.

For example, as shown in the left side of FIG. 5B, in a situation where the display panel 110 is not stretched, the capacitance of a stretch variable capacitor SVC formed by an upper electrode and a lower electrode completely facing each other may have the value of C.

In contrast, when the display panel 110 is stretched, the upper electrode and the lower electrode forming the stretch variable capacitor SVC may not completely face each other. For example, in a situation where half of the area of the upper electrode and half of the area of the lower electrode face each other, the capacitance of the stretch variable capacitor SVC may be reduced to C/2, which is half of the capacitance value C in the situation where the display panel 110 is not stretched.

Therefore, As shown in FIG. 5A, when the display panel 110 is stretched, a delay time until an output signal (output voltage) is output from the output terminal of the stretch detection circuit after the voltage signal (input voltage) is applied to the input terminal of the stretch detection circuit may be reduced because a respective capacitance capacity of each stretch variable capacitor SVC is reduced compared with the situation where the display panel 110 is not stretched.

In this situation, corresponding signal lines may not deliver intended voltages to corresponding electrodes or circuit elements at intended timings, or differences in signal delivering speed between the signal lines may occur. As the signal delivering of the signal lines is not normally performed, the display device 100 or the display panel may suffer from the degradation of image quality.

Hereinafter, discussions are provided for a process of compensating for or correcting a corresponding data voltage by detecting whether the display panel 110 is stretched with reference to FIG. 5C.

When the display panel 110 is not stretched, a delay time from an input time at which an input signal is applied to the input terminal to an output time at which an output signal is output from the output terminal through the stretch detection circuit in response to the input signal can be measured. The delay time from the input time to the output time may be counted by a high-speed counter, and the delay time may be converted into a digital code by the high-speed counter. The converted digital code may be used to determine a degree to which the display panel 110 is stretched. For example, the delay time may be M.

When the display panel 110 is stretched, a delay time from an input time at which an input signal is applied to the input terminal to an output time at which an output signal is output from the output terminal through the stretch detection circuit in response to the input signal may be measured. Likewise, a delay time from the input time to the output time may be counted by a high-speed counter, and the delay time may be converted into a digital code by the high-speed counter. The converted digital code may be used to determine a degree to which the display panel 110 is stretched. For example, when the delay time is N, M may be a value greater than N as described above.

Figure 7:
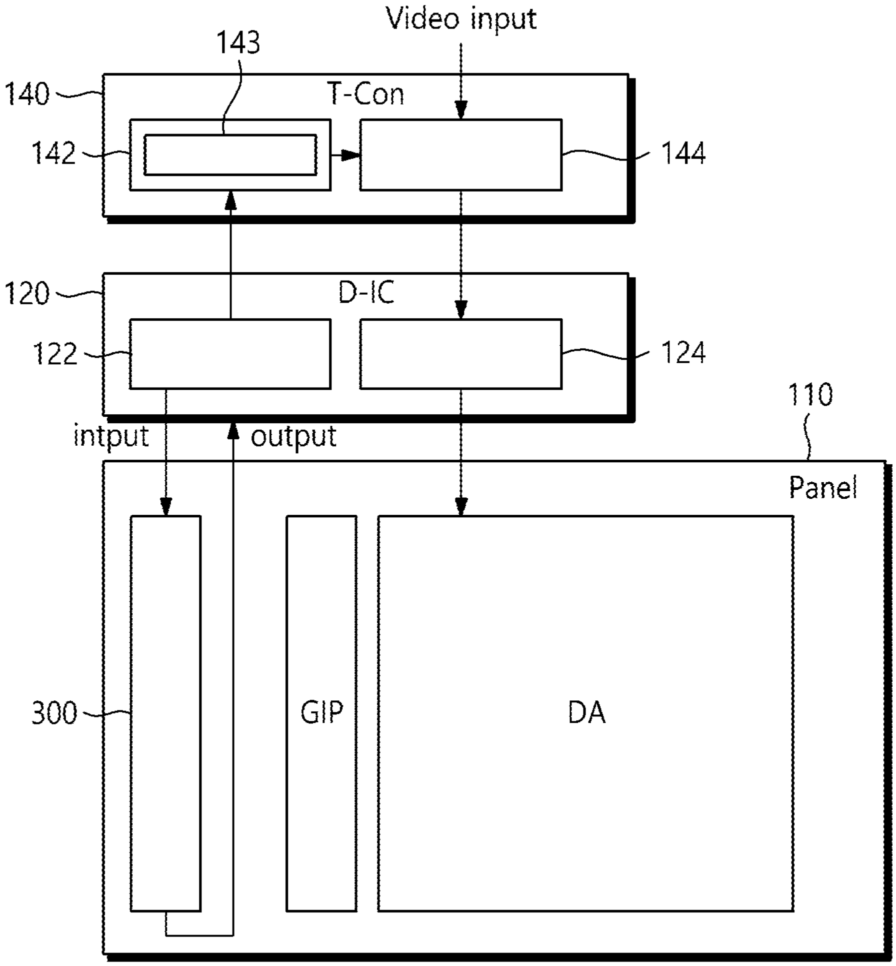
FIG. 7 illustrates an example configuration of the stretchable display device according to aspects of the present disclosure.

Accordingly, a compensation control signal generator 142 as shown in FIG. 7 may determine whether the display panel 110 is stretched based on a difference (M-N) between the delay time M measured by the stretch detection circuit when the display panel 110 is not stretched and the delay time N measured by the stretch detection circuit when the display panel 110 is stretched.

Thereafter, a gain may be obtained by multiplying the (M-N) value by a preset constant (parameter) a. The obtained gain may be applied to compensate for or correct a corresponding data voltage, and thereby, a corrected data voltage can be obtained. Here, the constant $\alpha$ may be obtained based on a lookup table in which information on constants mapped to values of (M-N) is stored in advance.

Accordingly, such a corrected data voltage can be obtained to eliminate or reduce luminance unevenness as the display panel 110 is stretched.

The configurations of FIGS. 5A to 5C are related to an example situation in which a delay time measured by the stretch detection circuit is reduced when the display panel 110 is stretched.

Hereinafter, in contrast to the example discussed with reference to FIGS. 5A to 5C, an example where a delay time measured by the stretch detection circuit is increased when the display panel 110 is stretched is discussed with reference to FIG. 6.

Figure 6:
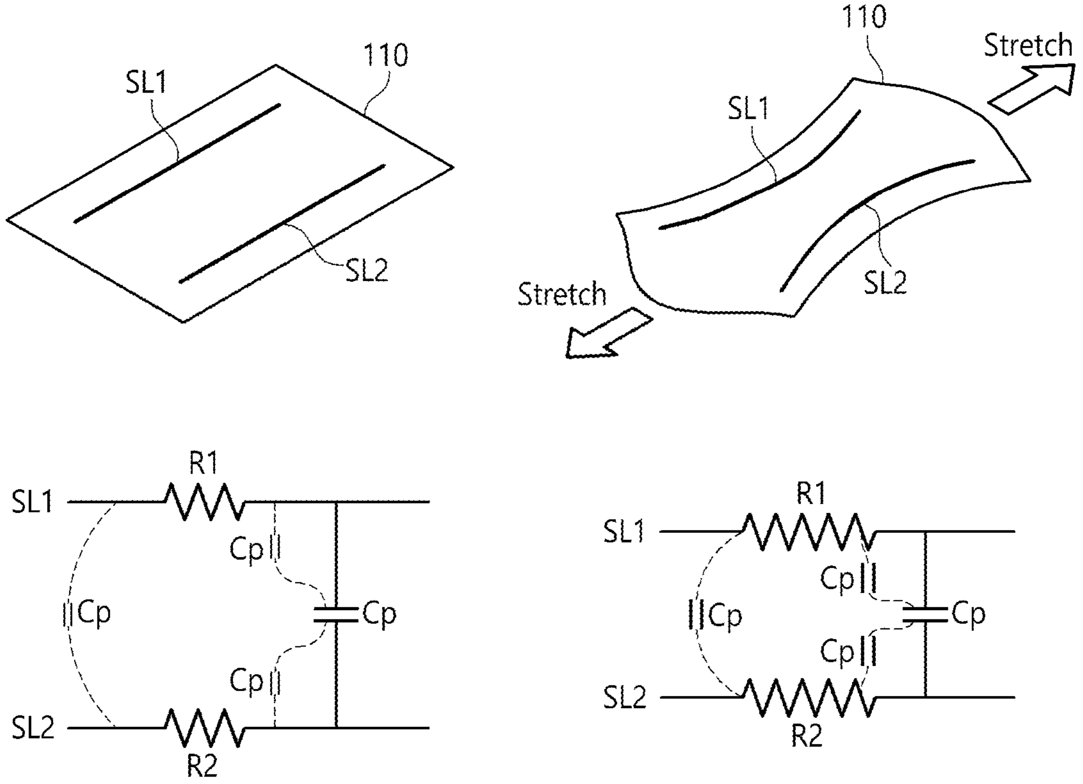
FIG. 6 illustrates an example change in the display panel as the display panel is stretched according to aspects of the present disclosure.

As shown in FIG. 6, when the display panel 110 is stretched, lines (SL1 and SL2) disposed in the display panel 110 may also be stretched. In this situation, when each of the lines (SL1 and SL2) is stretched, the length of the lines (SL1 and SL2) becomes greater, and thereby, the resistance values (R1 and R2) of the lines (SL1 and SL2) may increase. In addition, when the display panel 110 is stretched, a distance between the lines (SL1 and SL2) may be reduced, and thereby, corresponding parasitic capacitance Cp may increase.

Accordingly, a respective time constant of each of the lines (SL1 and SL2) may increase.

This time constant (t) may be referred to as RC delay (i.e., t=R*C).

When the display panel 110 is stretched from a flat state, time constants of the lines (SL1 and SL2) may increase, and thereby, a delay time from a time at which a voltage is input to one end of each of the lines (SL1 and SL2) to a time at which a voltage output from the other end of each of the lines (SL1 and SL2) reaches a voltage with an intended level may be increased.

In this situation, the lines (SL1 and SL2) may not deliver the intended voltages to corresponding electrodes or circuit elements at intended timings, or a difference in signal delivering speed between the lines (SL1 and SL2) may be caused. As the signal delivering of the lines (SL1 and SL2) is not normally performed, the display device 100 or the display panel may suffer from the degradation of image quality.

For example, when signals having a specific voltage waveform are scan signals (SCAN1 and SCAN2) applied to gate lines GL, the first and second transistors (T1 and T2) of FIG. 3 may be turned on or turned off at intended timings. Accordingly, corresponding subpixels SP may not emit light at intended timings or may not represent intended luminance, this resulting in poor image quality.

As shown in FIG. 6, when a first time constant SEN1 is greater than a first reference time constant value REF1 (i.e., SEN1>REF1), the controller 140 may determine that the time constant of the first line SL1 has increased compared to the reference time constant (a time constant in a normal state (i.e., a state where the display panel 110 is not stretched) as the first line SL1 has been lengthened (i.e., the resistance of the first line SL1 is increased). Taking into this situation, in order to compensate for the increased time constant, the controller 140 can output a control signal (e.g., DCS, GCS, or another signal) to cause one or more driver or circuit (e.g., a data output digital-to-analog converter (DAC) 124 of the driving circuit 120, the gate driving circuit 130, the power management circuit, and/or the like) to drive a signal driving line (e.g., a data line, a gate line, a reference voltage line, and/or the like) connected to a corresponding pixel or subpixel at a timing earlier than a reference driving timing (a driving timing in the normal state).

Figure 12:
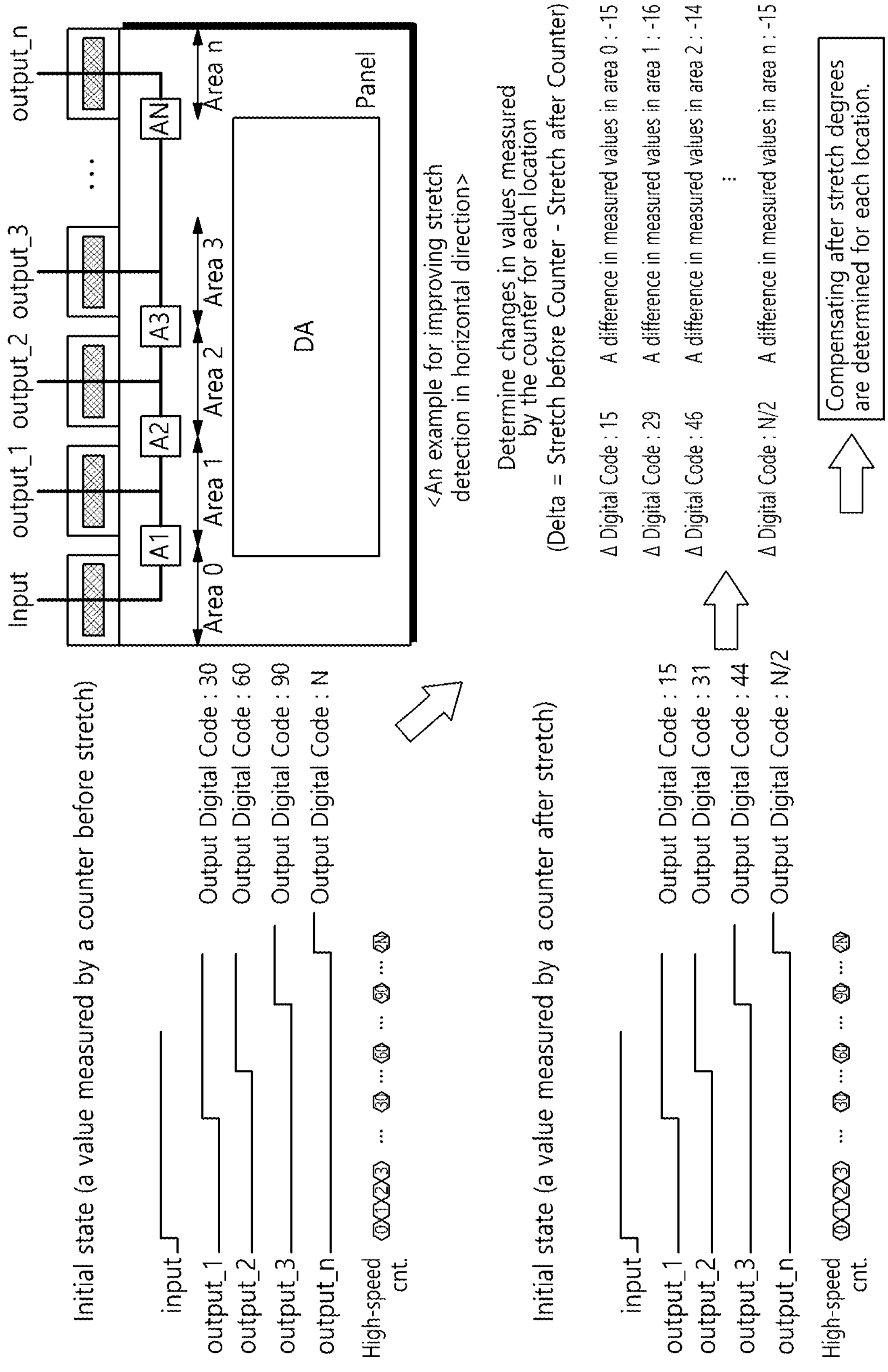
FIG. 12 illustrates a technique of comparing output times before and after the display panel is stretched in corresponding locations of the display panel based on amounts of elapsed time obtained by a high-speed counter according to aspects of the present disclosure.

Although FIG. 6 illustrates a situation where the RC time constants of the lines (SL1 and SL2) increase due to the stretching of the lines (SL1 and SL2) as the display panel 110 is stretched, it should be noted that as shown in FIG. 12, there may be present a situation where the RC time constants of signal lines become smaller due to the stretching of the display panel 110. This situation has been described in detail with reference to FIGS. 5A to 5C. FIG. 12 is related to a situation where corresponding delay is reduced when the display panel 110 is stretched, this is described later.

As described above, in one or more aspects, even when as the display panel 110 is stretched, the time constants of the lines (SL1 and SL2) change or a difference in time constant between the lines (SL1 and SL2) is caused, the display device 100 as a stretchable display device can provide advantages of compensating for such the time constant changes of the lines (SL1 and SL2) or the time constant difference between the lines (SL1 and SL2) to prevent image quality from being degraded.

In order to provide this advantage, as discussed above with reference to FIG. 5A, the stretchable display device 100 and the driving circuit 140 of driving the display panel 110 may include at least one stretch detection circuit by which whether a stretched situation occur can be detected, and a degree of the stretch can be detected, and be configured to detect a delay time caused by the stretch and generate a compensation control signal compensating for a data signal based on detected delay time. For example, the at least one stretch detection circuit may be configured to detect changes in delay times caused by the stretch.

These operations are described in detail below with reference to FIGS. 7 to 13.

FIG. 7 illustrates an example configuration of the stretchable display device 100 according to aspects of the present disclosure.

As shown in FIG. 7, in one or more example embodiments, the stretchable display device 100 may include the display panel 110, the data driving circuit 120 (or a source driver integrated circuit), and the timing controller 140.

As shown in FIG. 7, for example, a stretch detection circuit 300 may be located in at least a portion of the non-display area NDA of the display panel 110, and be configured to detect a degree of stretch of the display panel 110 based on a delay time measured by the stretch detection circuit 300 when the display panel 110 is stretched.

The stretch detection circuit 300 may be disposed in such a non-display area and be connected to a line running through the display panel 110.

The stretch detection circuit 300 may include at least one stretch variable capacitor SVC and at least one delay cell.

As discussed with reference to FIGS. 5A to 5C, when the display panel 110 is stretched, to compensating for a reduction of a delay time detected by the stretch detection circuit 300, the stretch detection circuit 300 may be configured such that a delay cells (Dly cell) is connected between adjacent stretch variable capacitors SVC. In one or more aspects, the at least one stretch variable capacitor SVC may include a plurality of stretch variable capacitors SVC, and the at least one delay cell (Dly cell) may include a plurality of delay cells (Dly cell). For example, each stretch variable capacitors SVC and each delay cells (Dly cell) may form a stretch detection cell pair. In this manner, the plurality of delay cells and the plurality of stretch variable capacitors may form a plurality of stretch detection cell pairs, respectively, and the plurality of stretch detection cell pairs may be connected to each other in series such that the plurality of delay cells are connected to each other in series, and the plurality of stretch variable capacitors are connected in parallel to one or more adjacent delay cells.

For example, each delay cell (Dly cell) may be configured with an inverter gate, a buffer, a resistor, and the like. In this example, when a voltage signal (input voltage) from a preceding delay cell (Dly cell) or a driver (e.g., the data driving circuit 120 or the source driver integrated circuit) is applied to a stretch variable capacitor SVC connected to a delay cell (Dly cell), the stretch variable capacitor SVC can store the applied voltage, and when the stretch variable capacitor SVC completes the storing, the stored voltage can be applied to a next delay cell (Dly cell) connected to the stretch variable capacitor SVC. In this manner, after the voltage signal (the input voltage) is applied to the input terminal of the stretch detection circuit, an output signal (output voltage) can be provided by an output terminal of the stretch detection circuit by sequentially passing through the plurality of stretch detection cells (the plurality of stretch detection cell pairs).

The stretch detection circuit 300 may be connected to a dedicated line for stretch detection, and be disposed in the display panel 110 in a first or second direction. Here, the first direction may be the row or horizontal direction of the display panel 110, and the second direction may be the column or vertical direction of the display panel 110.

The data driving circuit 120 (or the source driver integrated circuit) may apply an input signal (input) to the stretch detection circuit 300 to detect a delay time caused by stretch, and receive an output signal (output) output through the stretch detection circuit 300 in response to the input signal.

The data driving circuit 120 (or the source driver integrated circuit) may include a stretch detector 122 configured to detect a delay time caused by the stretch based on the received output signal.

The timing controller 140 may include a compensation control signal generator 142 configured to receive information or data for the delay time from the stretch detector 122 and generate a compensation control signal for compensating for a corresponding data signal based on the information or data for the delay time.

The compensation control signal generator 142 may include a stretch occurrence location estimator 143 configured to estimate a coordinate range of an area in which the display panel 110 is stretched.

The stretch occurrence location estimator 143 may receive stretch occurrence location information from the stretch detector 122. For example, the stretch occurrence location information may be information on the location of a pixel (e.g., coordinates of the pixel). For example, information on the location of a pixel may be information on at least one row and at least one column defining the pixel.

Accordingly, the compensation control signal can be used for compensating for a driving timing, a voltage, one or more signal characteristics, and the like of a signal to be delivered to a pixel or a line of the pixel located at a location indicated at the stretch occurrence location information.

The timing controller 140 may include a data output circuit 144 configured to generate a signal based on the compensation control signal and provide the generated signal to the data output digital-to-analog converter (DAC) 124 of the data driving circuit 120 (or the source driver integrated circuit).

In this implementation, the timing controller 140 may control one or more timings for driving all or one or more of the plurality of lines, or cause one or more characteristics of the signal supplied to all or one or more of the plurality of lines to be changed, based on the compensation control signal.

The data output digital-to-analog converter (DAC) 124 may receive the signal compensated by the timing controller 140 from the data output circuit 144, and apply the received signal to a corresponding data line extending to the display area DA. For example, the data line may be a data line connected to a pixel indicated at stretch occurrence location information.

Figure 8:
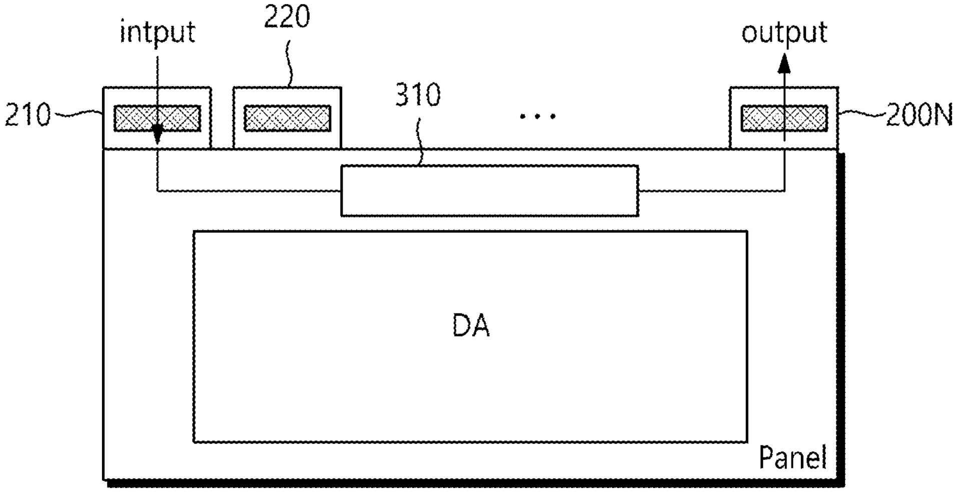
FIG. 8 illustrates an example configuration of the stretchable display device including a stretch detection circuit for detecting stretch in a row direction according to aspects of the present disclosure.
Figure 9:
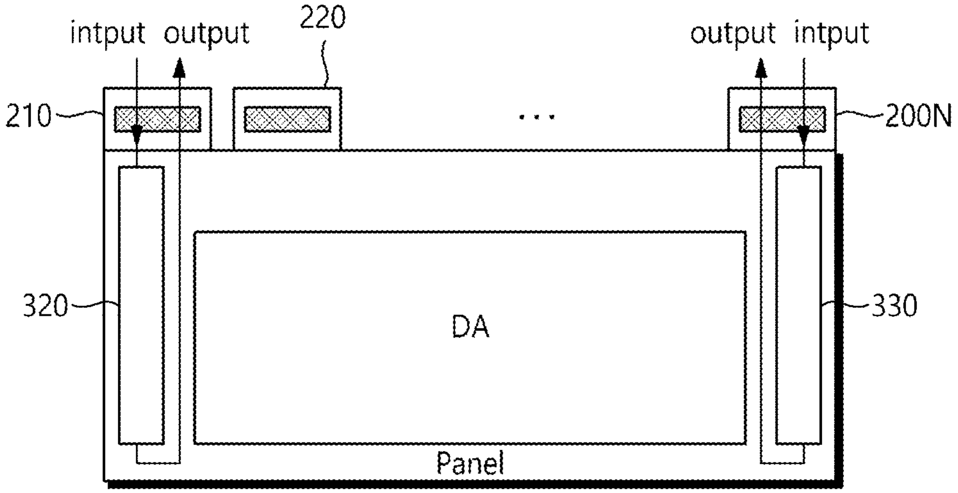
FIG. 9 illustrates an example configuration of the stretchable display device including a stretch detection circuit for detecting stretch in a column direction according to aspects of the present disclosure.

FIG. 8 illustrates an example configuration of the stretchable display device including a stretch detection circuit for detecting stretch in a row direction according to aspects of the present disclosure. FIG. 9 illustrates an example configuration of the stretchable display device including a stretch detection circuit for detecting stretch in a column direction according to aspects of the present disclosure.

As shown in FIG. 8, a stretch detection circuit 310 may be disposed in at least a portion of the non-display area of the display panel in the row or horizontal direction, and include two or more stretch detection cells connected to each other in series such that two or more delay cells are connected to each other in series, and two or more stretch variable capacitors are connected in parallel to one or more adjacent delay cells. The stretch detection circuit 310 can detect a delay time caused in a situation where an upper portion of the display panel 110 is stretched in the row or horizontal direction, and provide information or data for the delay time to the stretch detector 122.

To detect whether the upper portion of the display panel 110 is stretched in the row or horizontal direction, the stretchable display device 100 may include the stretch detection circuit 310 (which may be referred to as an upper stretch detection circuit 310) disposed in a portion of the non-display area corresponding to the upper portion of the display panel 110. Although FIG. 8 illustrates only the upper stretch detection circuit 310, example embodiments of the present disclose are not limited to this. For example, a lower stretch detection circuit may also be additionally disposed in a portion of the non-display area corresponding to a lower portion of the display panel 110.

For example, when an upper portion and a lower portion of the display panel 110 is defined, the upper portion of display panel 110 may be connected to the upper stretch detection circuit 310, and the lower portion of the display panel 110 may be connected to a lower stretch detection circuit. In this implementation, a stretch occurring in the upper portion of the display panel 110 and a stretch occurring in the lower portion can be detected separately.

For example, FIG. 8 illustrates that when a plurality of source drive integrated circuits (210 to 200N) are disposed, an input signal may be applied through one source drive integrated circuit 210, and an output signal output through the stretch detection circuit 310 in response to the input signal may be received by another source drive integrated circuit 200N. Although FIG. 8 illustrates that an input signal is applied by one source drive integrated circuit and an output signal is received by another source drive integrated circuit, example embodiments of the present disclose are not limited to this.

To implement this configuration, a first source drive integrated circuit 210 for applying an input signal, the stretch detection circuit 310, and an Nth source drive integrated circuit 200N for outputting an output signal may be electrically connected to each other, and defect whether the display panel 110 is stretched in the row or horizontal direction.

For example, a dedicated line disposed for stretch detection may be connected from the first source drive integrated circuit 210 to the Nth source drive integrated circuit 200N.

For example, as shown in FIG. 8, the stretch detection circuit 310 may be located in at least a portion of the non-display area NDA, and when the display panel 110 is stretched, the stretch detection circuit 310 can detect a delay time caused by the stretch performed in the horizontal direction (a first direction) through at least one stretch detection cell disposed in the horizontal direction.

As shown in FIGS. 7 and 8, the delay time detected by the stretch detection circuit (300 or 310) may be provided to the stretch detector 122 and then provided to the compensation control signal generator 142.

A value related to a delay time for the dedicated line disposed in the display panel 110 in the normal state in which the display panel 110 is not stretched or a state (e.g., a flat state before the display panel 110 is stretched may be stored in advance in a memory as a reference delay time value M. Further. information on constants (parameter) $\alpha$ mapped to differences between the reference time M and delay times N when the display panel 110 is stretched may be stored in advance in the memory as a lookup table. The constant $\alpha$ may be a parameter for obtaining a gain for compensation based on a difference value (M-N) between the delay time N and the reference time M.

By using reference delay time values stored in advance for a plurality of dedicated lines, the controller 140 or the compensation control signal generator 142 can detect whether at least one of the plurality of dedicated lines is stretched or a degree of stretch of the at least one dedicated line when the at least one dedicated line is stretched, or can determine a respective amount of change in delay time of the at least one dedicated line.

As shown in FIG. 12, for delay times before and after one or more portions of the display panel 110 are stretched, the controller 140 can compare changes in delay times (or respective amounts of change in delay times) measured by one or more high-speed counters.

FIG. 12 shows that in a structure where lines are disposed on different areas in the column or vertical direction or the lines are disposed in different layers, when the display panel 110 is stretched, areas intersected by the lines in the vertical direction may be reduced, this leading parasitic capacitance to be reduced, and thereby, as amounts of change in resistance values caused by the stretch are reduced, in contrast to the example of FIG. 6, a corresponding delay time may be reduced when the display panel 110 is stretched.

As shown in FIG. 9, the stretchable display device 100 may include at least one stretch detection circuit (320 and/or 330) disposed in at least one portion of the non-display area corresponding to at least one side (or edge) of the display panel 110 for detecting whether the display panel 110 is stretched in the column or vertical direction. For example, as shown in FIG. 9, stretch detection circuits (320 and 330) may be disposed on both left and right sides of the display panel 110, respectively.

For example, a plurality of source drive integrated circuits (210 to 200N) may be disposed in the display device 100.

In this example, among the plurality of source drive integrated circuits (210 to 200N), a first source drive integrated circuit 210 may be configured to apply an input signal to a first stretch detection circuit 320, which is located in the left side of the display panel 110, and may be referred to as a left stretch detection circuit 320, and receive an output signal output through the first stretch detection circuit 320 in response to the input signal, and an Nth source drive integrated circuit 200N may be configured to apply an input signal to a second stretch detection circuit 330, which is located in the right side of the display panel 110, and may be referred to as a right stretch detection circuit 330, and receive an output signal output through the second stretch detection circuit 330 in response to the input signal. According to this example, a stretch of the display panel 110 in the vertical direction may be detected through the first stretch detection circuit 320 and the second stretch detection circuit 330.

For example, as shown in FIG. 9, the stretch detection circuits (320 and 330) may be disposed in respective portions of the non-display area NDA corresponding to the left and right sides of the display panel 110 in the column or vertical direction. When the display panel 110 is stretched, the stretch detection circuits (320 and 330) can detect a delay time caused by the stretch performed in the vertical direction and provide information or date for delay times to the stretch detector 122.

The stretch detection circuits (320 and 330) may detect the delay times affected by the stretch and provide the information or date for the delay times to the stretch detector 122, and then, the stretch detector 122 may provide the information or date for the delay times to the compensation control signal generator 142 to estimate whether the stretch has occurred in the vertical direction and a degree of the stretch.

To enable this configuration to be implemented, the controller 140 may store a lookup table that specifies degrees of stretch occurring in the display panel 110 based on delay times in a memory in advance.

In the example of FIG. 9, since the stretchable display device 100 includes the stretch detection circuits (320 and 330) disposed in the left and right sides of the display panel 110 in the column or vertical direction, the stretchable display device 100 can detect whether the stretch has occurred in the vertical direction and determine a degree of the stretch has occurred in the vertical direction, based on delay times detected by the stretch detection circuits (320 and 330).

Figure 10:
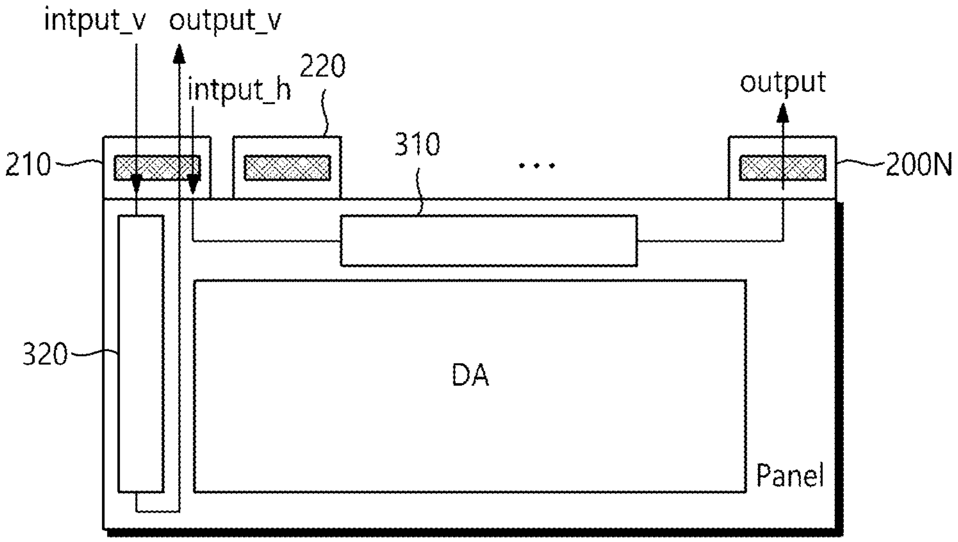
FIG. 10 illustrates an example configuration of the stretchable display device including stretch detection circuits for concurrently detecting stretch in both the row and column directions in according to aspects of the present disclosure.

FIG. 10 illustrates an example configuration of the stretchable display device 100 including stretch detection circuits for concurrently detecting stretch in both the row and column directions in according to aspects of the present disclosure.

As shown in FIG. 10, in one or more aspects, the stretchable display device 100 may be configured with a structure where the upper stretch detection circuit 310 disposed in the horizontal direction and the left stretch detection circuit 320 disposed in the vertical direction, which are included in the configurations of FIGS. 8 and 9, respectively, are disposed in the display panel 110.

Accordingly, as the stretchable display device 100 is configured with both the upper stretch detection circuit 310 and the left stretch detection circuit 320, the stretchable display device 100 can simultaneously detect a horizontal stretch and a vertical stretch occurring in the display panel 110.

As shown in FIG. 10, a delay time detected through the upper stretch detection circuit 310 due to a stretch occurring in the horizontal direction may be provided to the stretch detector 122. The compensation control signal generator 142 can detect the occurrence of the stretch or determine a degree of the stretch in the horizontal direction based on information or data for the delay time, and generate a compensation control signal to compensate for a corresponding data signal depending on the stretch degree.

Further, a delay time detected through the left stretch detection circuit 320 due to a stretch occurring in the vertical direction may be provided to the stretch detector 122. The compensation control signal generator 142 can detect the occurrence of the stretch or determine a degree of the stretch in the vertical direction based on information or data for the delay time, and generate a compensation control signal to compensate for a corresponding data signal depending on the stretch degree.

Figure 11:
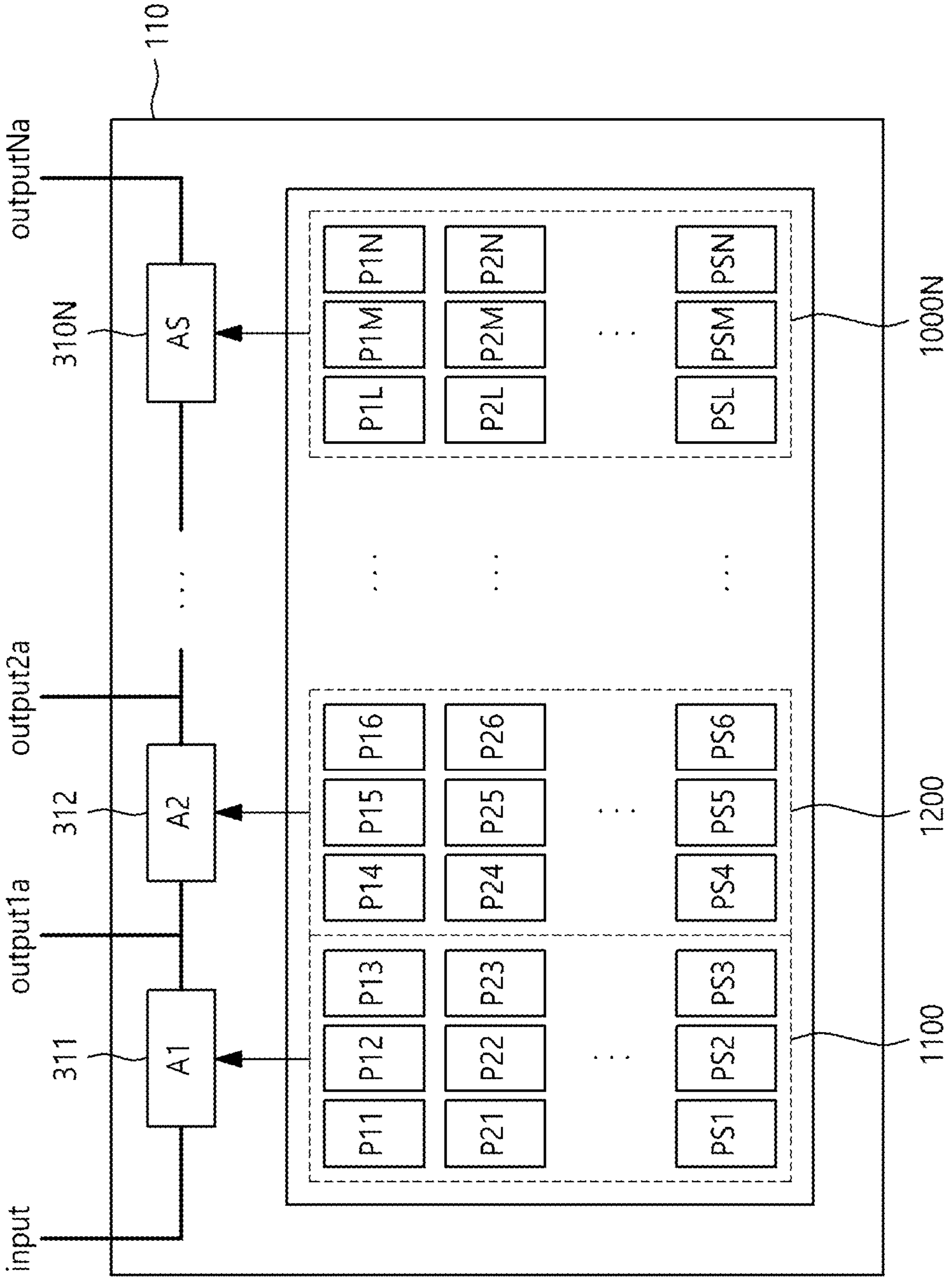
FIG. 11 illustrates an example configuration of the display pane including stretch detection circuits for detecting stretch based on each of a plurality of pixel groups in the stretchable display device according to aspects of the present disclosure.

FIG. 11 illustrates an example configuration of the display pane 110 including at least one stretch detection circuit group for detecting stretch based on each of a plurality of pixel groups in the stretchable display device 100 according to aspects of the present disclosure.

As shown in FIG. 11, a first stretch detection circuit group may include a plurality of first stretch detection circuits (311 to 310N) respectively corresponding to a plurality of first pixel groups (1100 to 1000N) divided on at least one pixel basis in a first direction.

As shown in FIG. 11, the plurality of first pixel groups may include pixel group 1 (1100) to pixel group N (1000N) from left to right, and each pixel group (1100 to 1000N) may include at least one pixel disposed in the first direction.

FIG. 11 illustrates that a plurality of pixels disposed in the display panel 110 are grouped into pixel group 1 (1100) to pixel group N (1000N) on three pixels basis in the first direction, but this is only an example. Thus, the number of pixels disposed in the same row included in each pixel group are not limited to this.

The relationship or correspondence of the plurality of first stretch detection circuits (311 to 310N) and the plurality of first pixel groups (1100 to 1000N) as shown in FIG. 11 may represent that a stretch performed in the first direction in an area where one of the plurality of first pixel groups is disposed can be detected by a corresponding one of the plurality of first stretch detection circuits (311 to 31N). That is, the plurality of first stretch detection circuits (311 to 310N) and the plurality of first pixel groups (1100 to 1000N) may not directly electrically connected to each other.

For example, as shown in FIG. 11, when the display panel 110 is stretched in the first direction in an area where pixel group 1 (1100) is disposed, one first stretch detection circuit 311 may detect this stretch by detecting a delay time affected by the stretch. When the display panel 110 is stretched in the first direction in an area where pixel group 2 (1200) is disposed, another first stretch detection circuit 312 may detect this stretch by detecting a delay time affected by the stretch.

For example, each of the plurality of first stretch detection circuits (311 to 310N) can detect a respective delay time caused by a stretch occurred in an area where a corresponding one of the plurality of first pixel groups (1100 to 1000N) is disposed.

To implement this configuration, each of the plurality of first stretch detection circuits (311 to 310N) may include at least one capacitor and at least one resistor, which are configured to receive an input signal corresponding to a corresponding one of the plurality of first pixel groups (1100 to 1000N) and output an output signal in response to the input signal. The output signal may be information on a time at which the output signal is output through an output terminal of the corresponding stretch detection circuit in response to the input signal with a predetermined level applied to an input terminal thereof.

Each of the plurality of first stretch detection circuits (311 to 310N) can detect a first delay time, which may be a time from an input time at which an input signal is applied to a corresponding stretch detection circuit to an output time at which an output signal is output through the stretch detection circuit in response to the input signal, and provide information or data for the first delay time to the stretch detector 122. Thereafter, the stretch detector 122 may provide the information or data for the first delay time to the compensation control signal generator 142, and the compensation control signal generator 142 can determine whether the display panel 110 is stretched or a degree to which the display panel 110 is stretched by comparing the information or data for the first delay time with a reference delay time (e.g., a first reference delay time) stored in advance in the memory.

For example, the stretch detector 122 may convert a value of the output signal (e.g., an output time) or a delay time from the input time to the output time into a digital code (or a digital value) using a high-speed counter, and provide the digital code (or the digital value) representing a degree to which the display panel 110 is stretched to the timing controller 140.

FIG. 12 illustrates a technique of comparing output times before and after the display panel is stretched in corresponding locations of the display panel based on amounts of elapsed time obtained by a high-speed counter according to aspects of the present disclosure.

As shown in FIGS. 11 and 12, to increase the accuracy of stretch detection for each location of the display panel 110, each of stretch detection circuits (A1 to AS) may configured to be associated with a respective one of source driver integrated circuits. Each of stretch detection circuits (A1 to AS) may detect the occurrence of a stretch or determine a degree of the stretch in a respective one of pixel groups (1100 to 1N00) located in pixel areas of the display panel 110.

For example, the controller 140 may detect the occurrence of a stretch or a degree of the stretch by comparing output times (or delay times) before and after the stretch occurs for each pixel group based on amounts of elapsed time obtained by a high-speed counter.

The technique in which the controller 140 compares delay times before and after a stretch occurs for each location (or each area or each pixel group) of the display panel 110 based on amounts of elapsed time obtained by a high-speed counter has been discussed above with reference to FIGS. 7 and 12. For FIG. 11, this technique may be applied to each pixel group.

As shown in FIGS. 7 and 12, for example, when in a portion of the display panel corresponding to 'area 0' (or 'pixel area 0' or 'pixel group 0') of a plurality of first pixel groups, a digital value of an output signal before a stretch occurs is 30 and a digital value of an output signal after a stretch occurs is 15, a difference between amounts of elapsed time measured by a high-speed counter for the output signals before and after the stretch may be −15.

The compensation control signal generator 142 may extract, among values stored in advance, a value matched to a degree of the stretch corresponding to the elapsed time difference of −15, determine a degree of the stretch based on the extracted value, and generate a compensation control signal based on a gain lookup table (LUT) stored in advance for the determined degree of the stretch, and the data output circuit 144 may provide a feedback signal (e.g., a compensated data signal, a signal with changed characteristics, or a compensated power voltage) to the display panel 110 based on the compensation control signal.

For example, the compensation control signal generator 142 may generate a compensation control signal for each area (area 0 to area n) depending on the occurrence of a stretch in each area (area 0 to area n) and a degree of the stretch. The data output circuit 144 may output a compensated signal based on the compensation control signal for the occurrence of the stretch in each area (area 0 to area n) to the data output digital-to-analog converter (DAC) 124. The data output digital-to-analog converter (DAC) 124 may convert the compensated signal into an analog signal and provide the analog signal resulting from the converting to pixels and signal lines corresponding to each area (area 0 to area n).

Similarly, when in a portion of the display panel corresponding to 'area 1' (or 'pixel area 1' or 'pixel group 1') of the plurality of first pixel groups, a digital value of an output signal before a stretch occurs is 80 and a digital value of an output signal after a stretch occurs is 31, a difference between amounts of elapsed time measured by a high-speed counter for the output signals before and after the stretch may be −16. Further, when in a portion of the display panel corresponding to 'area 2' (or 'pixel area 2' or 'pixel group 2') of the plurality of first pixel groups, an digital value of an output signal before a stretch occurs is 90 and a digital value of an output signal after a stretch occurs is 44, a difference between amounts of elapsed time measured by a high-speed counter for the output signals before and after the stretch may be −14.

In this manner, elapsed time differences before and after a stretch occurs in respective areas (area 0 to area n) corresponding to pixel groups located at different locations (or areas) of the display panel 110 may be different from each other. In one or more situations, elapsed time differences before and after a stretch occurs in respective areas (area 0 to area n) corresponding to pixel groups located at different locations (or areas) of the display panel 110 may be the same. This is because such elapsed time differences are depending on the location and intensity of a stretch occurred in the display panel 110.

The compensation control signal generator 142 may determine elapsed time differences before and after a stretch occurs in each area (area 0 to area n), extract, among values representing degrees of stretch stored in advance, a value matched to a degree of the stretch corresponding to the determined elapsed time difference, determine the stretch degree based on the extracted value, generate a compensation control signal based on, among compensation information or data according to degrees of stretch stored in advance, compensation information or data corresponding to the stretch degree determined for each area (area 0 to area n), and provide a feedback signal for compensating for a change caused by the occurrence of the stretch in a corresponding area based on the generated compensation control signal.

Figure 13:
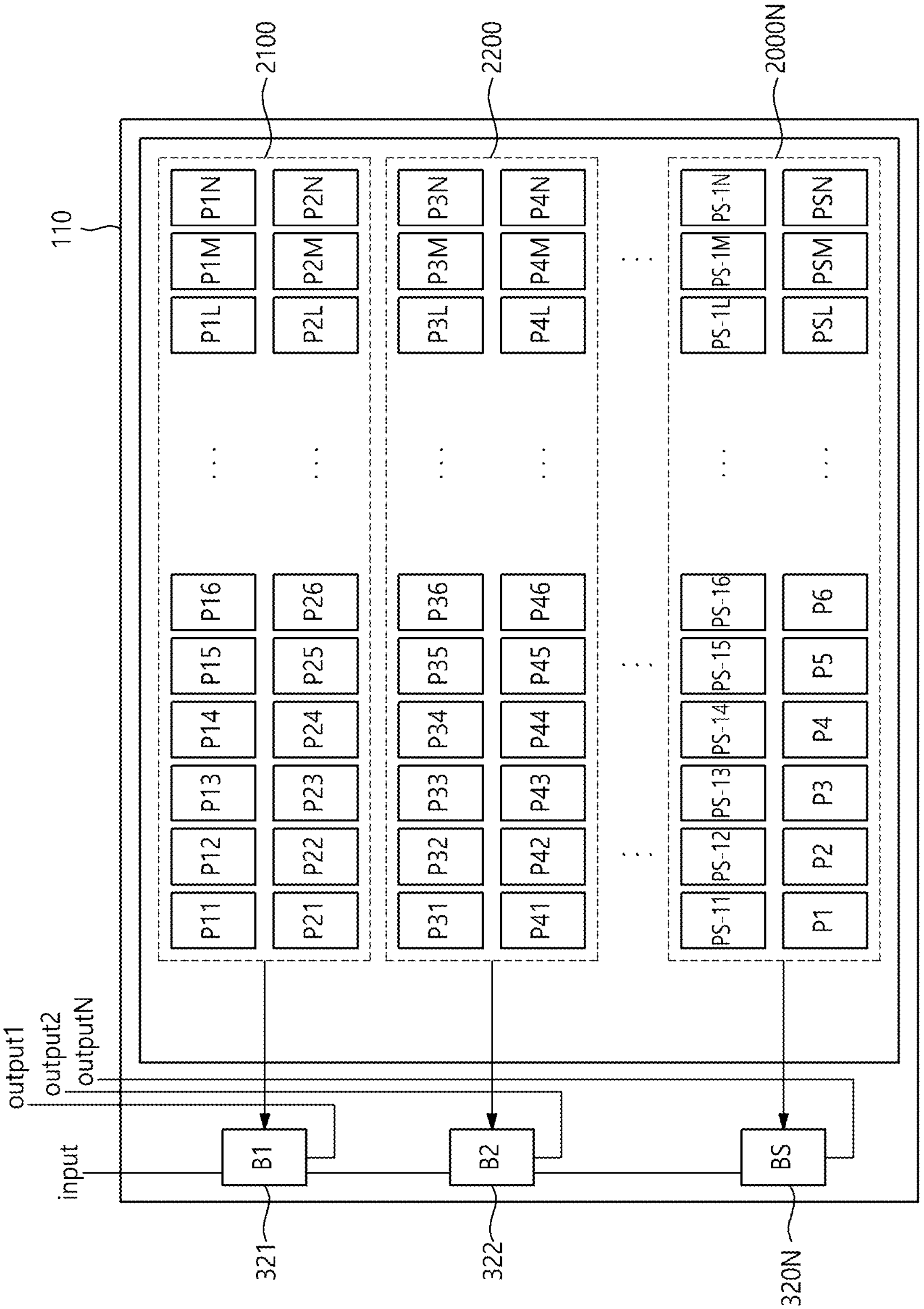
FIG. 13 illustrates an example configuration of the display pane for detecting stretch based on each of a plurality of pixel groups according to aspects of the present disclosure.

FIG. 13 illustrates an example configuration of the display pane for detecting stretch based on each of a plurality of pixel groups according to aspects of the present disclosure.

As shown in FIG. 13, a second stretch detection circuit group may include a plurality of second stretch detection circuits (321 to 320N) respectively corresponding to a plurality of second pixel groups (2100 to 2000N) divided on at least one basis in a second direction.

As shown in FIG. 13, the plurality of second pixel groups (2100 to 2000N) may include pixel group 1 (2100) to pixel group N (2000N) from top to bottom, and each of the plurality of second pixel groups (2100 to 2000N) may include at least one pixel disposed in the second direction.

FIG. 13 illustrates that a plurality of pixels disposed in the display panel 110 are grouped into pixel group 1 (2100) to pixel group N (2000N) on two pixels basis in the second direction, but this is only an example. Thus, the number of pixels disposed in the same column included in each pixel group are not limited to this.

The relationship or correspondence of the plurality of second stretch detection circuits (321 to 320N) and the plurality of second pixel groups (2100 to 2000N) as shown in FIG. 13 may represent that a stretch performed in the second direction in an area where one of the plurality of second pixel groups is disposed can be detected by a corresponding one of the plurality of second stretch detection circuits (321 to 320N). That is, the plurality of second stretch detection circuits (321 to 320N) and the plurality of second pixel groups (2100 to 2000N) may not directly electrically connected to each other.

For example, as shown in FIG. 13, when the display panel 110 is stretched in the second direction in an area where pixel group 1 (2100) is disposed, a second stretch detection circuit 321 may detect this stretch by detecting a delay time affected by the stretch. When the display panel 110 is stretched in the second direction in an area where pixel group 2 (2200) is disposed, another second stretch detection circuit 322 may detect this stretch by detecting a delay time affected by the stretch.

For example, each of the plurality of second stretch detection circuits (321 to 320N) can detect a respective delay time caused by a stretch occurred in an area where a corresponding one of the plurality of second pixel groups (2100 to 2000N) is disposed.

To implement this configuration, each of the plurality of second stretch detection circuits (321 to 320N) may include at least one capacitor and at least one resistor, which are configured to receive an input signal corresponding to a corresponding one of the plurality of second pixel groups (2100 to 2000N) and output an output signal in response to the input signal. For example, the output signal may be a delay time.

Each of the plurality of second stretch detection circuits (321 to 320N) can detect a second delay time, which may be a time from an input time at which an input signal is applied to a corresponding stretch detection circuit to an output time at which an output signal is output through the stretch detection circuit in response to the input signal, and provide information or data for the second delay time to the stretch detector 122. Thereafter, the stretch detector 122 may provide the information or data for the second delay time to the compensation control signal generator 142, and the compensation control signal generator 142 can determine whether the display panel 110 is stretched or a degree to which the display panel 110 is stretched by comparing the information or data for the second delay time with a reference delay time (e.g., a second reference delay time stored in advance in the memory.

For example, the stretch detector 122 may convert a value of the output signal or a delay time from the input time to the output time into a digital code (or a digital value) using a high-speed counter, and provide the digital code (or the digital value) representing a degree to which the display panel 110 is stretched to the timing controller 140.

As shown in FIGS. 7, 11, and 12, when a value related to the first delay time is greater than the first reference delay time value through the comparing, the compensation control signal generator 142 may provide a control signal for causing a driving circuit (e.g., the data driving circuit 120 (or the source driver integrated circuit), the gate driving circuit 130, the power management circuit, and/or the like) to drive a signal driving line (e.g., a data line, a gate line, a reference voltage line, and/or the like) located in an area where a corresponding pixel group is located at a timing earlier than a reference driving timing. For example, the first reference delay time value may mean a delay time before a stretch occurs as described above.

When the value related to the first delay time is less than the first reference delay time value through the comparing, the compensation control signal generator 142 may provide a control signal for causing the driving circuit to drive the signal driving line located in the area where the corresponding pixel group is located at a timing later than the reference driving timing.

In one or more aspects, the compensation control signal generator 142 may compare the value related to the first delay time with the first reference delay time value, and depending on the result of the comparing, cause a characteristic of a signal output from the driving circuit (e.g., the data driving circuit 120 (or the source driver integrated circuit), the gate driving circuit 130, the power management circuit, and/or the like) to be changed and thus, a signal with the changed characteristic to be output from the driving circuit.

When the value related to the first delay time is greater than the first reference delay time value through the comparing, the compensation control signal generator 142 may cause, to be increased, a level or intensity of a signal to be supplied to a signal driving line located in an area where a corresponding pixel group is located, or cause the driving circuit (e.g., the data driving circuit 120 (or the source driver integrated circuit), the gate driving circuit 130, the power management circuit, and/or the like) to overdrive the signal to be supplied to the signal driving line, or cause an overdrive voltage applied to the signal to be supplied to the signal driving line to be increased.

When the value related to the first delay time is less than the first reference delay time value through the comparing, the compensation control signal generator 142 may cause, to be reduced, a level or intensity of the signal to be supplied to the signal driving line located in the area where the pixel group is located, or cause the driving circuit (e.g., the data driving circuit 120 (or the source driver integrated circuit), the gate driving circuit 130, the power management circuit, and/or the like) not to overdrive the signal to be supplied to the signal driving line, or cause an overdrive voltage applied to the signal to be supplied to the signal driving line to be reduced.

When the value related to the first delay time is less than the first reference delay time value, the compensation control signal generator 142 may determine that a stretch has occurred at the corresponding location of the display panel 110, and to compensate for the reduced delay time, provide a control signal (e.g., DCS, GCS, or another control signal) causing the driving circuit (e.g., the data driving circuit 120 (or the source driver integrated circuit), the gate driving circuit 130, the power management circuit, and/or the like) to drive a signal driving line located in the area where the corresponding pixel group is located at a timing later than a reference driving timing (e.g., a driving timing in a normal state).

When the value related to the first delay time is less than the first reference delay time value, to compensate for the reduced delay time, the compensation control signal generator 142 may cause, to be reduced, a level or intensity of the signal driving line located in the area where the corresponding pixel group is located by the driving circuit (e.g., the data driving circuit 120 (or the source driver integrated circuit), the gate driving circuit 130, the power management circuit, and/or the like), or cause the driving circuit (e.g., the data driving circuit 120 (or the source driver integrated circuit), the gate driving circuit 130, the power management circuit, and/or the like) not to overdrive the signal to be supplied to the signal driving line, or cause an overdrive voltage applied to the signal to be supplied to the signal driving line to be reduced.

Figure 14:
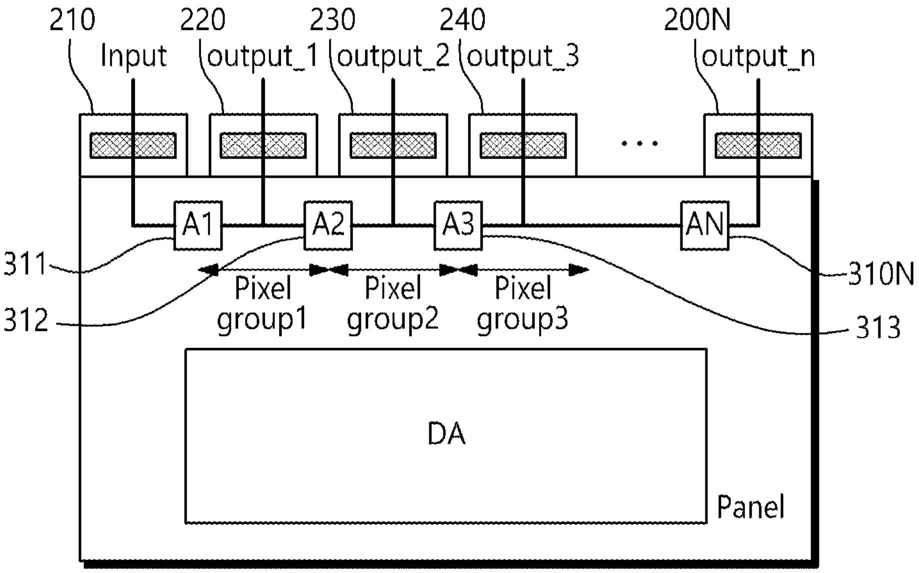
FIG. 14 illustrates an example configuration of the display device for concurrently detecting stretch based on each of a plurality of pixel groups in both row and column directions according to aspects of the present disclosure.

FIG. 14 illustrates an example configuration of the display device for concurrently detecting stretch based on each of a plurality of pixel groups in both row and column directions according to aspects of the present disclosure.

As shown in FIG. 14, the display device 100 may include a first stretch detection circuit group including a plurality of first stretch detection circuits (311 to 310N) disposed in a first direction (the horizontal direction) and a second stretch detection circuit group including a plurality of second stretch detection circuits (321 to 320M) disposed in a second direction (the vertical direction). Although not shown, stretch detection circuits may be further disposed on the right side of the display panel 110. For example, the display panel 110 may include a first region and a second region defined in the horizontal direction. In this example, a stretch occurred in the first region may be detected by one or more of the stretch detection circuits disposed on the left side of the display panel 110, and a stretch occurred in the second region may be detected by one or more of the stretch detection circuits disposed on the right side of the display panel 110.

As shown in FIGS. 7 and 14, the compensation control signal generator 142 may generate a compensation control signal by considering the first delay time and the second delay time together.

For example, the compensation control signal generator 142 may detect a first delay time from each of the plurality of first stretch detection circuits (311 to 310N), and determine whether a stretch occurs in the horizontal direction and a degree of the stretch by comparing the first delay time with a first reference delay time stored in advance in the memory.

Further, the compensation control signal generator 142 may detect a second delay time from each of the plurality of second stretch detection circuits (321 to 320M), and determine whether a stretch occurs in the vertical direction and a degree of the stretch by comparing the second delay time with a second reference delay time stored in advance in the memory.

For example, the first delay time and the second delay time may be converted into digital codes through a high-speed counter.

The compensation control signal generator 142 may generate a luminance compensation control signal for the display panel 110 based on the occurrence of the stretch in the horizontal direction and the degree of the stretch, and the occurrence of the stretch in the vertical direction and the degree of the stretch, which have been determined as discussed above. For example, the stretch detector 122 may detect row and column axes at which the occurrence of the stretch is estimated based on the first delay time and the second delay time, which have been obtained through the plurality of first stretch detection circuits (311 to 310N) and the plurality of second stretch detection circuits (321 to 320M), and set an area of the display panel 110 where the detected row and column axes cross each other as a stretch occurrence estimation location.

For example, a degree of stretch may be determined based on a multiple of an increased size of the display panel 110 by stretch relative to a normal size of the display panel 110 before the display panel 110 is stretched. For example, a degree of stretch may be determined depending on a multiple of a horizontal size of the display panel 110 stretched in the horizontal direction relative to the normal size of the display panel 110 and a multiple of a vertical size of the display panel 110 stretched in the vertical direction relative to the normal size of the display panel 110.

The compensation control signal generator 142 may compare the determined stretch degree with a preset stretch level and compensate for luminance by performing one or more luminance adjustment levels step by step. The luminance adjustment levels may mean levels or degrees of luminance to be compensated based on comparison between the preset stretch level and the determined stretch degree, and be set to levels 1 to N.

In some situation, a degree of stretch of the display panel 110 may exceed a designated standard stretch level, and in this situation, color coordinates may be distorted depending on one or more characteristics of the display panel 110, in addition to the luminance of the display panel 110.

As discussed above, to compensate for such distorted color coordinates, the compensation control signal generator 142 may determine output compensation color coordinates based on the horizontal stretch degree in the horizontal direction and the vertical stretch degree in the vertical direction, which have been determined in the previous stage, and generate a color coordinate compensation control signal based on the output compensation color coordinates.

For example, a degree of stretch may be determined based on a degree of an increased size of the display panel 110 by a stretch compared to a normal size of the display panel 110 before the display panel 110 is stretched. For example, driving for compensating for color coordinates may be discretely performed for each classified mode based on a horizontal size of the display panel 110 stretched in the horizontal direction.

For example, the compensation control signal generator 142 may compare the determined stretch degree with a preset stretch degree, and adjust color coordinate compensation for each mode based on the comparing. For example, when a length increased by stretch is the length level of 1, a corresponding color coordinate compensation mode may be set to mode 1, and when a length increased by stretch is the length level of 1.5, a corresponding color coordinate compensation mode may be set to mode 2, and when a length increased by stretch is the length level of 2, a corresponding color coordinate compensation mode may be set to mode 3.

The color coordinate compensation mode may mean a degree of color coordinates to be compensated based on comparison between the preset stretch level and the determined stretch degree, and be set to levels 1 to N.

For example, the compensation control signal generator 142 may generate a compensation control signal for each coordinate range based on a stretch degree in the first pixel group, a stretch degree in the second pixel group, and a coordinate range at which it is estimated by the stretch occurrence location estimator 143 that a stretch has occurred. In other words, at least one data signal may be generated for compensating for at least one pixel corresponding to coordinates of at least one location where the occurrence of the stretch is estimated.

The compensation control signal generator 142 may generate a compensation control signal for each coordinate range based on a stretch degree in the first pixel group, a stretch degree in the second pixel group, and a coordinate range of the non-display area at which it is estimated by the stretch occurrence location estimator 143 that a stretch has occurred.

In one or more aspects, the stretch detector 122 may detect row and column axes where the occurrence of a stretch is estimated, and set an area of the display panel 110 where the detected row and column axes cross each other as a stretch occurrence estimation location. The compensation control signal generator 142 may generate a compensation control signal based on the degree of the stretch for a location of a corresponding pixel group set as the stretch occurrence estimation location, that is, a pixel group corresponding to the area of the display panel 110 where the row and column axes, in which the occurrence of the stretch is estimated, cross each other.

In one or more aspects, the stretch detector 122 may further include the stretch occurrence location estimator 143 configured to estimate a coordinate range in which a stretch has occurred. The coordinate range in which the stretch has occurred may refer to, for example, a coordinate area (or coordinates of an area) including at least one pixel.

For example, the stretch occurrence location estimator 143 may detect first location coordinates in the first direction in the first pixel group in which it is detected that the stretch have occurred based on the first delay time, and second location coordinates in the second direction in the second pixel group in which it is detected that the stretch have occurred based on the second delay time. Further, a coordinate range in which the stretch has occurred may be estimated based on combination of the detected first location coordinates and the detected second location coordinates.

For example, As shown in FIG. 14, when it is detected that a stretch has occurred in at least one of the plurality of first stretch detection circuits (311 to 310N), location coordinates of pixels (a pixel group) corresponding to the corresponding stretch detection circuit may be detected as first location coordinates. For example, the location coordinates of pixels arranged on the same vertical line as the corresponding first stretch detection circuit may be detected as the first location coordinates.

Further, when it is detected that a stretch has occurred in at least one of the plurality of second stretch detection circuits (321 to 320M), location coordinates of pixels (a pixel group) corresponding to the corresponding stretch detection circuit may be detected as second location coordinates. For example, the location coordinates of pixels arranged on the same vertical line as the corresponding second stretch detection circuit may be detected as the second location coordinates.

Further, the stretch occurrence location estimator 143 may determine location coordinates of pixels overlapping with each other based on the detected first and second location coordinates as a coordinate range in which the stretch has occurred. The method of determining a coordinate range where stretch has occurred is not limited to this, and one or more other methods may also be employed.

Figure 15:
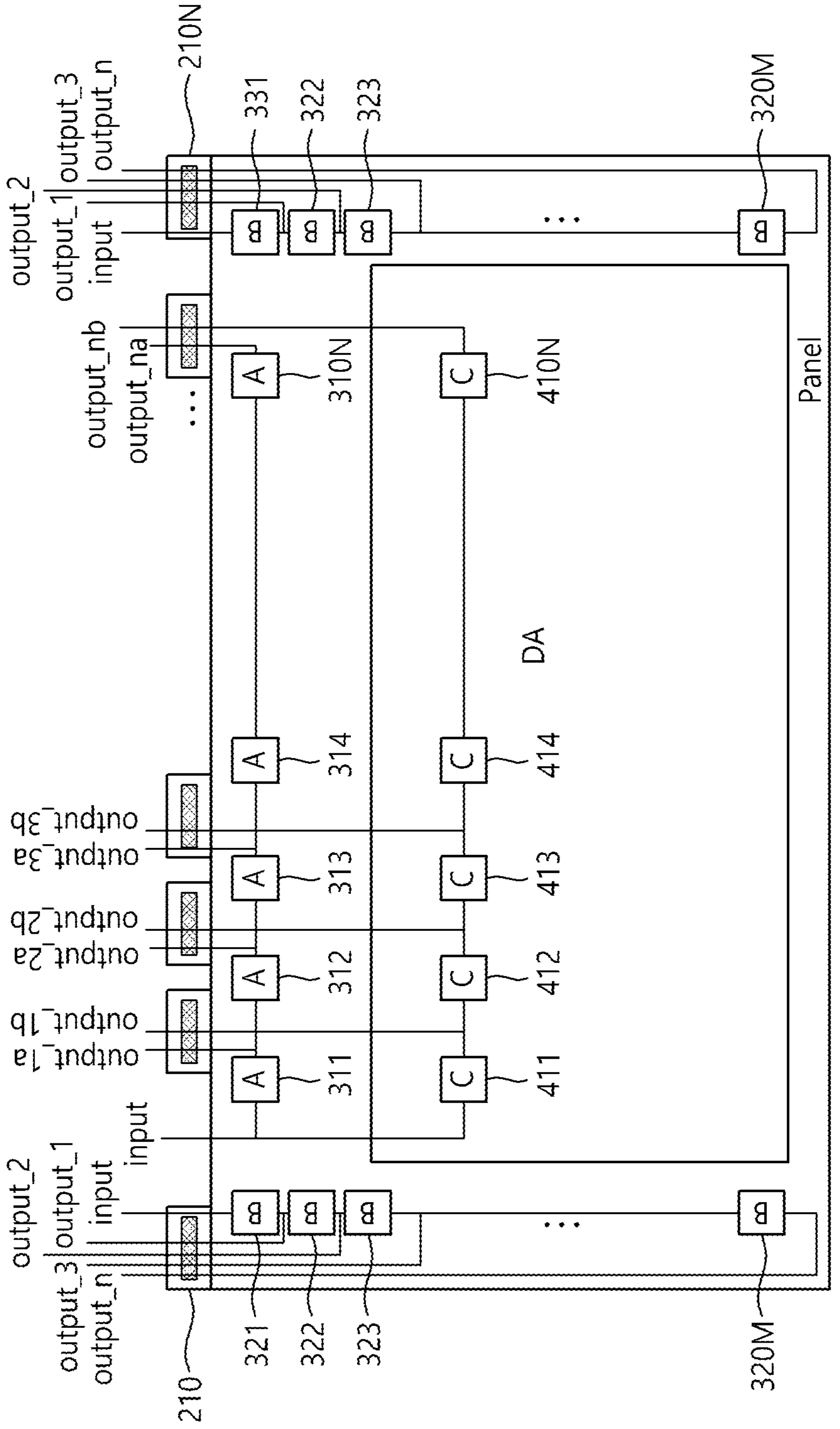
FIG. 15 illustrates an example configuration of the stretchable display device including stretch detection circuits for detecting stretch according to aspects of the present disclosure.

FIG. 15 illustrates an example configuration of the stretchable display device 100 including stretch detection circuits for detecting stretch according to aspects of the present disclosure.

As shown in FIG. 15, in one or more example embodiments, the stretchable display device 100 according to aspects of the present disclosure may additionally include stretch detection circuits disposed at a predetermined interval in at least a portion of the display area DA.

For example, the stretchable display device 100 may include a third stretch detection circuit group including one or more third stretch detection circuits C disposed in an intermittent pattern or at an interval on a plurality of pixels basis in at least a portion of the display area DA.

For example, each of a plurality of third stretch detection circuits C included in the third stretch detection circuit group may include at least one capacitor and at least one resistor. When a stretch occurs in the display area DA, each of the plurality of third stretch detection circuits C may detect a third delay time reflecting a change caused by the stretch, and provide the detected third delay time to the stretch detector 122.

The stretch occurrence location estimator 143 may detect, as location coordinates (e.g., third location coordinates), a location of a pixel group adjacent to or facing a corresponding stretch detection circuit C by which the third delay time has been detected based on the third delay time provided from the stretch detector 122.

Further, the stretch occurrence location estimator 143 may accurately determine a location at which a stretch has occurred by comparing at least one location coordinates among first location coordinates detected through at least one first stretch detection circuit A included in the first stretch detection circuit group, and second location coordinates detected through at least one second stretch detection circuit B included in the second stretch detection circuit group, which are discussed above with reference to FIG. 14, and third location coordinates detected through at least one third stretch detection circuit C included in the third stretch detection circuit group.

For example, a location at which the stretch has occurred may be determined as coordinates corresponding to a location where the first location coordinates, the second location coordinates, and the third location coordinates overlap with each other, or coordinates corresponding to a location where the first location coordinates, the second location coordinates, and the third location coordinates are adjacent to each other at a predetermined interval in a preset distance. This method of determining a location where a stretch has occurred is only an example, and other methods may also be employed.

In FIG. 15, in one or more aspects, only the third stretch detection circuits C included in the third stretch detection circuit group disposed in the display area DA may be used to detect whether the display panel 110 is stretched and a degree of the stretch, and the first stretch detection circuits A included in the first stretch detection circuit group and the second stretch detection circuits B included in the second stretch circuit group may be turned off.

Figure 16:
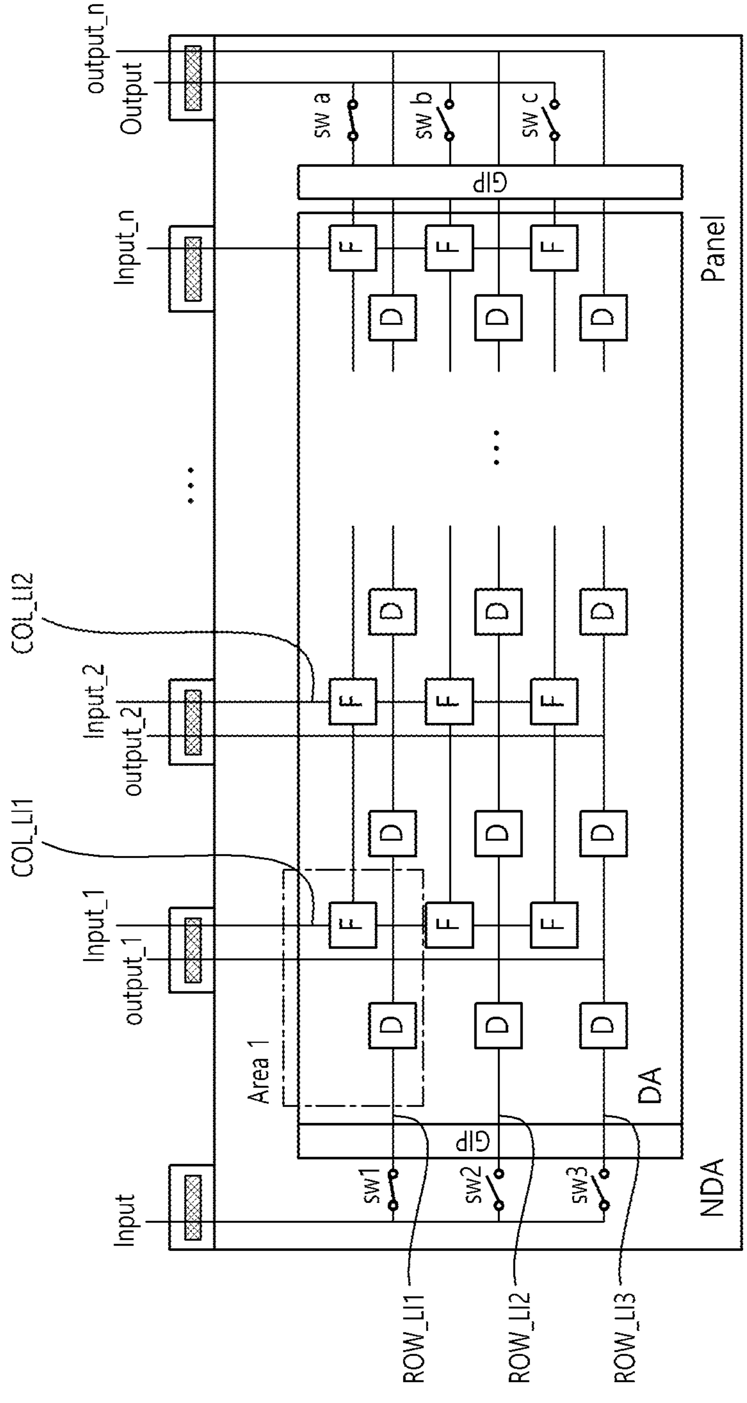
FIG. 16 illustrates an example configuration of the display device including a plurality of stretch detection circuits spaced apart by a predetermined interval from each other in first and second directions in a display area of the display panel according to aspects of the present disclosure.

FIG. 16 illustrates an example configuration of the display device 100 including a plurality of stretch detection circuits spaced apart by a predetermined interval from each other in first and second directions in the display area DA of the display panel 110 according to aspects of the present disclosure.

Compared to the configuration of FIG. 15, the configuration of FIG. 16 may include the first stretch detection circuits A and the second stretch detection circuits B (not shown), which are included in configuration of FIG. 15 discussed above, and further include a plurality of fourth stretch detection circuit groups spaced apart at a predetermined interval in the first direction in the display area DA, each of the plurality of fourth stretch detection circuit groups including a plurality of fourth stretch detection circuits D, and a plurality of fifth stretch detection circuit groups spaced apart at a predetermined interval in the second direction in the display area DA, each of the plurality of fifth stretch detection circuit groups including a plurality of fifth stretch detection circuits F.

For example, the stretchable display device 100 may include the plurality of fourth stretch detection circuits D included in each of the fourth stretch detection circuit groups spaced apart from each other along the first direction in an intermittent pattern relative to the arrangement of pixels or at an interval on a plurality of pixels basis in at least a portion of the display area DA, and the plurality of fifth stretch detection circuits F included in each of the fifth stretch detection circuit groups spaced apart from each other along the second direction in an intermittent pattern relative to the arrangement of pixels or at an interval on a plurality of pixels basis in at least a portion of the display area DA.

The fourth stretch detection circuit groups may be disposed along a plurality of row lines spaced apart at a predetermined interval from the top to the bottom of the display panel 110, and each of the fourth stretch detection circuit groups may include the plurality of fourth stretch detection circuits D spaced apart at a predetermined interval in the row direction.

The fifth stretch detection circuit groups may be disposed along a plurality of column lines spaced apart at a predetermined interval from the right to the left of the display panel 110, and each of the fifth stretch detection circuit groups may include the plurality of fifth stretch detection circuits F spaced apart at a predetermined interval in the column direction.

As shown in FIG. 16, the controller 140 may select one or more areas of the display panel 110 as a sample to detect the occurrence of a stretch, and detect a stretch in the horizontal direction and a stretch in the vertical direction in the selected one or more areas by turning on one or more fourth stretch detection circuit groups and one or more fifth stretch detection circuit groups disposed in the selected one or more areas.

To implement this configuration, one or more fourth stretch detection circuits D may be configured to be spaced apart on a first row dedicated line ROW_LI1 disposed in the row direction, and a first switch SW1 may be connected to at least a portion of the first row dedicated line ROW_LI1. In this implementation, an input signal Input may be applied to one end of the first row dedicated line ROW_LI1, and an output signal output_n may be output through the other end of the first row dedicated line ROW_LI1. The configurations connected to a second row dedicated line ROW_LI2 and a third row dedicated line ROW_LI3 and operation of, or signal flow through, the second row dedicated line ROW_LI2 and the third row dedicated line ROW_LI3 may also correspond to those of the first row dedicated line ROW_LI1. For convenience of explanation, FIG. 16 illustrates only three row dedicated lines as an example, but example embodiments of the present disclosure are not limited thereto.

Further, one or more fifth stretch detection circuits F may be configured to be spaced apart on a first column dedicated line COL_LI1 disposed in the column direction, and an 11th switch SW1 may be connected to at least a portion of the first column dedicated line COL_LI1. In this implementation, an input signal Input may be applied to one end of the first column dedicated line COL_LI1, and an output signal output_n may be output through the other end of the first column dedicated line COL_LI1. The configurations connected to a second column dedicated line COL_LI2 and a third column dedicated line COL_LI3 and operation of, or signal flow through, the second column dedicated line COL_LI2 and the third column dedicated line COL_LI3 may also correspond to those of the first column dedicated line COL_LI1. For convenience of explanation, FIG. 16 illustrates only three column dedicated lines as an example, but example embodiments of the present disclosure are not limited thereto.

For example, the controller 140 may select area 1, which is an area of the display panel 110, as a sample, and to detect a stretch in the horizontal direction and a stretch in the vertical direction in area 1, the controller 140 may turn on the first switch SW1 and the 11th switch SWa, and turn off the remaining second switch SW2, third switch SW3, 12th switch SWb, and 13th switch SWc. Further, the controller 140 may apply an input signal Input to one end of the first row dedicated line ROW_LI1, obtain an output signal output1 through the other end of the first row dedicated line ROW_LI1, and detect whether a stretch occurs in the horizontal direction in area 1 and a degree of the stretch based on the obtained output signal output1. Further, the controller 140 may apply an input signal Input 1 to one end of the first column dedicated line COL_LI1, obtain an output signal output through the other end of the first column dedicated line COL_LI1, and detect whether a stretch occurs in the vertical direction in area 1 and a degree of the stretch based on the obtained output signal output.

The method for determining whether a stretch has occurred, and a degree of the stretch has been described in detail above.

Figure 17:
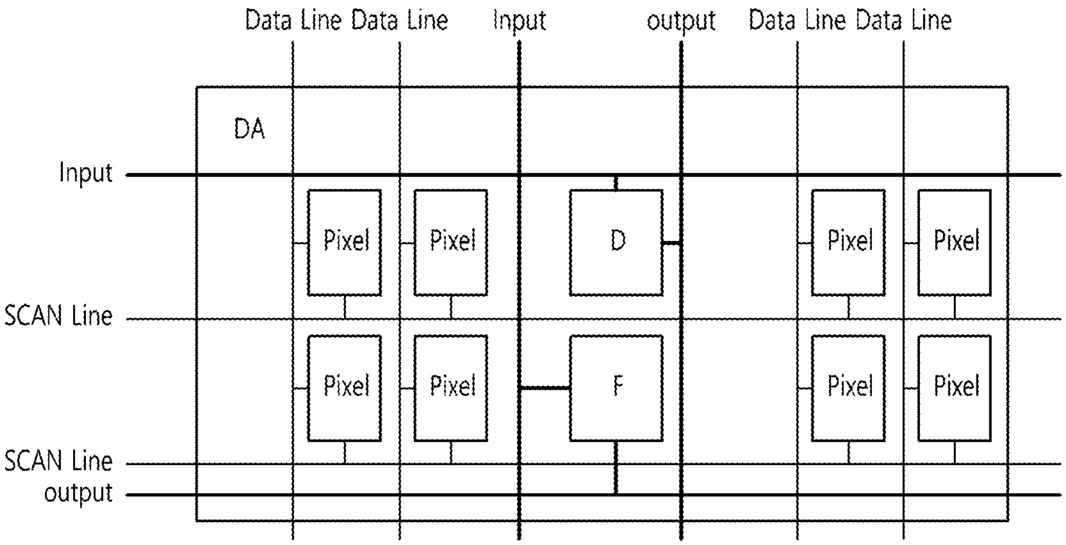
FIG. 17 is a plan view of an example configuration of a plurality of stretch detection circuits included in the stretchable display device according to aspects of the present disclosure.

As shown in FIG. 17, one or more fourth stretch detection circuits D included in each of the fourth stretch detection circuit groups for detecting a stretch in the horizontal direction and one or more fifth stretch detection circuits F in each of the fifth stretch detection circuit groups for detecting a stretch in the vertical direction may be located in respective areas of the display area DA between a plurality of pixels, in which a pixel is not formed. One or more third stretch detection circuits C included in the third stretch detection circuit group shown in FIG. 15 may also be disposed in an area of the display area DA between a plurality of pixels, in which a pixel is not formed.

For example, each of the fourth stretch detection circuits D included in each of the fourth stretch detection circuit groups and the fifth stretch detection circuits F included in each of the fifth stretch detection circuit groups may include at least one capacitor and at least one resistor.

Further, a first switch (SW1 to SWn) may be connected to one end of each row line to which one or more fourth stretch detection circuits D are connected, and a second switch (SWa to SWn) may be connected to one end of each column line to which one or more fifth stretch detection circuits F are connected.

The controller 140 may turn on and/or turn off first switches (SW1 to SWn) and/or second switches (SWa to SWn) alternately or sequentially, and detect stretches occurring in respective areas of the display panel 110.

For example, by controlling the turn-on and/or turn-off of the first switches (SW1 to SWn) and the second switches (SWa to SWn), the controller 140 may sequentially detect whether a stretch occurs and a degree of the stretch for respective areas of display panel 110, such as an area (a dotted box in FIG. 16) including one fourth stretch detection circuit D and one fifth stretch detection circuit F adjacent to the one fourth stretch detection circuit D from the left to the right and/or from the top to the bottom of the display panel 110.

As discussed with reference to FIG. 15, the stretch occurrence location estimator 143 may detect, as third location coordinates, a location of an area in which a stretch has been detected based on a third delay time. That is, coordinates corresponding to one or more pixels adjacent to or facing an area in which the stretch has been detected may be detected as the third location coordinates.

Further, the stretch occurrence location estimator 143 may accurately determine a location at which a stretch has occurred by comparing at least one location coordinates among the first location coordinates detected through at least one first stretch detection circuit, and the second location coordinates detected through at least one second stretch detection circuit, which are discussed above with reference to FIG. 14, and the third location coordinates.

In FIG. 15, in one or more aspects, only the third stretch detection circuits C disposed in the display area DA may be used to detect whether the display panel 110 is stretched and a degree of the stretch, and the first stretch detection circuits A and the second stretch detection circuits B may be turned off.

The example embodiments described herein can be briefly discussed as follows.

According to the example embodiments of the present disclosure, a stretchable display device can be provided that includes a stretchable display panel allowing a plurality of pixels and a plurality of lines to be disposed and configured to be stretchable, a gate driving circuit configured to supply gate signals to the plurality of pixels through a plurality of gate lines, a data driving circuit configured to supply data signals or compensated data signals to the plurality of pixels through a plurality of data lines, at least one stretch detection circuit group including at least one delay cell and at least one stretch variable capacitor disposed in a non-display area of the display panel, and detecting a delay time caused by stretch of the stretchable display panel, a compensation control signal generator configured to generate a compensation control signal based on the delay time, and a timing controller configured to output a compensated signal based on the compensation control signal.

In one or more aspects, the at least one stretch detection circuit group may be configured as follows: the at least one delay cell may include a plurality of delay cells, and the at least one stretch variable capacitor may include a plurality of stretch variable capacitors; the plurality of delay cells and the plurality of stretch variable capacitors may form a plurality of stretch detection cell pairs, respectively; and two or more of the stretch detection cell pairs may be connected to each other in series such that two or more of the plurality of delay cells are connected to each other in series, and each of two or more of the plurality of stretch variable capacitors is connected in parallel to one or more adjacent delay cells.

In one or more aspects, the at least one stretch detection circuit group may include a first stretch detection circuit group including at least one first delay cell and at least one first stretch variable capacitor disposed in a first direction in the non-display area, and configured to detect a first delay time caused by the stretch of the stretchable display panel and a second stretch detection circuit group including at least one second delay cell disposed in a second direction intersecting the first direction in the non-display area and at least one second stretch variable capacitor, and configured to detect a second delay time caused by the stretch of the stretchable display panel.

In one or more aspects, the first stretch detection circuit group may include a plurality of first stretch detection circuits respectively corresponding to a plurality of first pixel groups divided on a plurality of pixels basis in the first direction, and each of the plurality of first stretch detection circuits may be configured to receive a first input signal corresponding to a respective one of the plurality of first pixel groups and output a first delay time in response to the first input signal.

In one or more aspects, the second stretch detection circuit group may include a plurality of second stretch detection circuits respectively corresponding to a plurality of second pixel groups divided on a plurality of pixels basis in the second direction, and each of the plurality of second stretch detection circuits may be configured to receive a second input signal corresponding to a respective one of the plurality of second pixel groups and output a second delay time in response to the second input signal.

In one or more aspects, the stretchable display device may further include a stretch occurrence location estimator configured to detect first location coordinates including information on rows and columns of a corresponding first pixel group in which a stretch is detected based on the first delay time, detect second location coordinates including information for rows and columns of a corresponding second pixel group in which the stretch is detected based on the second delay time, and estimate a coordinate range in which the stretch has occurred based on combination of the detected first location coordinates and the detected second location coordinates.

In one or more aspects, the compensation control signal generator may be configured to determine a stretch degree of each of the plurality of first pixel groups based on a change in the first delay time, and determine a stretch degree of each of the plurality of second pixel groups based on a change in the second delay time.

In one or more aspects, the compensation control signal generator may be configured to generate a compensation control signal for each coordinate range wherein based on the stretch degree of each of the plurality of first pixel groups, the stretch degree of each of the plurality of second pixel groups, and the coordinate range of a portion of the non-display area in which it is estimated by the stretch occurrence location estimator that the stretch has occurred.

In one or more aspects, the at least one stretch detection circuit group may further include a third stretch detection circuit group including a plurality of third stretch detection circuits disposed respectively corresponding to a plurality of third pixel groups divided on a plurality of pixels basis in the first direction in at least a portion of the display area of the display panel and configured to output a third delay time, and a fourth stretch detection circuit group including a plurality of fourth stretch detection circuits disposed respectively corresponding to a plurality of fourth pixel groups divided on a plurality of pixels basis in the second direction in at least a portion of the display area of the display panel and configured to output a fourth delay time.

In one or more aspects, the stretch occurrence location estimator may be configured to detect, as third location coordinates, a location of a third pixel group among the plurality of third pixel groups adjacent to, or facing, a corresponding third stretch detection circuit among the plurality of third stretch detection circuits in which the stretch is detected based on the third delay time, to detect, as fourth location coordinates, a location of a fourth pixel group among the plurality of fourth pixel groups adjacent to, or facing, a corresponding fourth stretch detection circuit among the plurality of fourth stretch detection circuits in which the stretch is detected based on the fourth delay time, and to estimate a coordinate range in which the stretch has occurred based on at least one of the first location coordinates, the second location coordinates, the third location coordinates, and the fourth location coordinates.

In one or more aspects, the plurality of first pixel groups and the plurality of second pixel groups may include the same number of pixel groups, In one or more aspects, the plurality of first pixel groups and the plurality of second pixel groups may include different numbers of pixel groups.

In one or more aspects, the plurality of first stretch detection circuits may be configured respectively to correspond to the plurality of first pixel groups divided on a source drive integrated circuit basis in the first direction, and receive an input signal from the data driving circuit and output an output signal through a predetermined number of capacitors and a predetermined number of resistors in response to the input signal.

In one or more aspects, the plurality of second stretch detection circuits may be configured respectively to correspond to the plurality of second pixel groups divided on a gate drive integrated circuit basis in the second direction, and receive an input signal from the data driving circuit and output an output signal through a predetermined number of capacitors and a predetermined number of resistors in response to the input signal.

According to the example embodiments of the present disclosure, a stretchable panel driving circuit configured to drive a stretchable display panel can be provided that includes at least one stretch detection circuit group including at least one delay cell and at least one stretch variable capacitor disposed in a non-display area of the stretchable display panel, and configured to detect a delay time caused by stretch of the stretchable display panel, a compensation control signal generator configured to generate a compensation control signal based on the delay time, and a driving circuit configured to generate a compensated signal based on the compensation control signal.

In one or more aspects, the at least one stretch detection circuit group may include a first stretch detection circuit group including at least one first delay cell and at least one first stretch variable capacitor disposed in a first direction in the non-display area, and configured to detect a first delay time caused by a stretch, and a second stretch detection circuit group including at least one second delay cell disposed in a second direction intersecting the first direction in the non-display area and at least one second stretch variable capacitor, and configured to detect a second delay time caused by the stretch.

In one or more aspects, the first stretch detection circuit group may be configured to detect a first delay time that is an output signal output by the first stretch detection circuit group due to the stretch, and the second stretch detection circuit group may be configured to detect a second delay time that is an output signal output by the second stretch detection circuit group due to the stretch.

In one or more aspects, the first stretch detection circuit group may include a plurality of first stretch detection circuits respectively corresponding to a plurality of first pixel groups divided on a plurality of pixels basis in the first direction, and each of the plurality of first stretch detection circuits may include at least one first delay cell and at least one first stretch variable capacitor, which are configured to receive a first input signal corresponding to a respective one of the plurality of first pixel groups and output an output signal in response to the first input signal.

In one or more aspects, the second stretch detection circuit group may include a plurality of second stretch detection circuits respectively corresponding to a plurality of second pixel groups divided on a plurality of pixels basis in the second direction, and each of the plurality of second stretch detection circuits may include at least one second delay cell and at least one second stretch variable capacitor, which are configured to receive a second input signal corresponding to a respective one of the plurality of second pixel groups and output an output signal in response to the second input signal.

In one or more aspects, the stretchable panel driving circuit may further include a stretch occurrence location estimator configured to detect first location coordinates including information on rows and columns of a corresponding first pixel group in which a stretch is detected based on the first delay time, detect second location coordinates including information for rows and columns of a corresponding second pixel group in which the stretch is detected based on the second delay time, and estimate a coordinate range in which the stretch has occurred based on the detected first location coordinates and the detected second location coordinates.

In one or more aspects, the compensation control signal generator may be configured to determine a stretch degree of each of the plurality of first pixel groups based on a change in the first delay time, and determine a stretch degree of each of the plurality of second pixel groups based on a change in the second delay time.

In one or more aspects, the at least one stretch detection circuit group further may include a third stretch detection circuit group including a plurality of third stretch detection circuits disposed respectively corresponding to a plurality of third pixel groups divided on a plurality of pixels basis in the first direction in at least a portion of the display area of the display panel and configured to output a third delay time, and a fourth stretch detection circuit group including a plurality of fourth stretch detection circuits disposed respectively corresponding to a plurality of fourth pixel groups divided on a plurality of pixels basis in the second direction in at least a portion of the display area of the display panel and configured to output a fourth delay time.

In one or more aspects, the stretchable panel driving circuit may further include a stretch occurrence location estimator configured to detect, as third location coordinates, a location of a third pixel group among the plurality of third pixel groups adjacent to, or facing, a corresponding third stretch detection circuit among the plurality of third stretch detection circuits in which the stretch is detected based on the third delay time, to detect, as fourth location coordinates, a location of a fourth pixel group among the plurality of fourth pixel groups adjacent to, or facing, a corresponding fourth stretch detection circuit among the plurality of fourth stretch detection circuits in which the stretch is detected based on the fourth delay time, and to estimate a coordinate range in which the stretch has occurred based on at least one of the first location coordinates, the second location coordinates, the third location coordinates, and the fourth location coordinates.

It will be apparent to those skilled in the art that the present disclosure is not limited by the above-described example embodiments and the accompanying drawings, and that various substitutions, modifications, and variations can be made in the present disclosure without departing from the spirit or scope of the disclosures. Therefore, the above example embodiments of the present disclosure are provided for illustrative purposes and are not intended to limit the scope or technical concept of the present disclosure. The protective scope of the present disclosure should be construed based on the following claims and their equivalents, and it is intended that the present disclosure cover all modifications and variations of this disclosure that come within the scope of the claims and their equivalents.

What is claimed is:

1. A stretchable display device, comprising:

a stretchable display panel including a plurality of pixels and a plurality of lines configured to be stretchable;

a gate driving circuit configured to supply gate signals to the plurality of pixels through a plurality of gate lines among the plurality of lines;

a data driving circuit configured to supply data signals or compensated data signals to the plurality of pixels through a plurality of data lines among the plurality of lines;

at least one stretch detection circuit group comprising at least one delay cell and at least one stretch variable capacitor disposed in a non-display area of the stretchable display panel, and configured to detect a delay time caused by a stretch of the stretchable display panel;

a compensation control signal generating circuit configured to generate a compensation control signal based on the delay time; and a timing control circuit configured to output a compensated signal based on the compensation control signal.

2. The stretchable display device of claim 1, wherein:

the at least one delay cell comprises a plurality of delay cells, and the at least one stretch variable capacitor comprises a plurality of stretch variable capacitors; and the plurality of delay cells and the plurality of stretch variable capacitors form a plurality of stretch detection cell pairs, respectively, and two or more of the stretch detection cell pairs are connected to each other in series such that two or more of the plurality of delay cells are connected to each other in series, and each of two or more of the plurality of stretch variable capacitors is connected in parallel to one or more adjacent delay cells.

3. The stretchable display device of claim 2, wherein the at least one stretch detection circuit group comprises:

a first stretch detection circuit group comprising at least one first delay cell and at least one first stretch variable capacitor disposed in a first direction in the non-display area, and configured to detect a first delay time caused by the stretch of the stretchable display panel; and a second stretch detection circuit group comprising at least one second delay cell disposed in a second direction intersecting the first direction in the non-display area and at least one second stretch variable capacitor, and configured to detect a second delay time caused by the stretch of the stretchable display panel.

4. The stretchable display device of claim 3, wherein:

the first stretch detection circuit group comprises a plurality of first stretch detection circuits respectively corresponding to a plurality of first pixel groups divided on a plurality of pixels basis in the first direction; and each of the plurality of first stretch detection circuits is configured to receive a first input signal corresponding to a respective one of the plurality of first pixel groups and output a first delay time in response to the first input signal.

5. The stretchable display device of claim 4, wherein:

the second stretch detection circuit group comprises a plurality of second stretch detection circuits respectively corresponding to a plurality of second pixel groups divided on a plurality of pixels basis in the second direction; and each of the plurality of second stretch detection circuits is configured to receive a second input signal corresponding to a respective one of the plurality of second pixel groups and output a second delay time in response to the second input signal.

6. The stretchable display device of claim 5, further comprising a stretch occurrence location estimating circuit configured to:

detect first location coordinates comprising information on rows and columns of a corresponding first pixel group in which a stretch is detected based on the first delay time;

detect second location coordinates comprising information for rows and columns of a corresponding second pixel group in which the stretch is detected based on the second delay time; and estimate a coordinate range in which the stretch has occurred based on combination of the detected first location coordinates and the detected second location coordinates.

7. The stretchable display device of claim 6, wherein the compensation control signal generating circuit is configured to:

determine a stretch degree of each of the plurality of first pixel groups based on a change in the first delay time; and determine a stretch degree of each of the plurality of second pixel groups based on a change in the second delay time.

8. The stretchable display device of claim 7, wherein based on the stretch degree of each of the plurality of first pixel groups, the stretch degree of each of the plurality of second pixel groups, and the coordinate range of a portion of the non-display area in which it is estimated by the stretch occurrence location estimating circuit that the stretch has occurred, the compensation control signal generating circuit is configured to generate a compensation control signal for each coordinate range.

9. The stretchable display device of claim 6, wherein the at least one stretch detection circuit group further comprises:

a third stretch detection circuit group comprising a plurality of third stretch detection circuits disposed respectively corresponding to a plurality of third pixel groups divided on a plurality of pixels basis in the first direction in at least a portion of the display area of the display panel and configured to output a third delay time; and a fourth stretch detection circuit group comprising a plurality of fourth stretch detection circuits disposed respectively corresponding to a plurality of fourth pixel groups divided on a plurality of pixels basis in the second direction in at least a portion of the display area of the display panel and configured to output a fourth delay time.

10. The stretchable display device of claim 9, wherein the stretch occurrence location estimating circuit is configured to:

detect, as third location coordinates, a location of a third pixel group among the plurality of third pixel groups adjacent to, or facing, a corresponding third stretch detection circuit among the plurality of third stretch detection circuits in which the stretch is detected based on the third delay time;

detect, as fourth location coordinates, a location of a fourth pixel group among the plurality of fourth pixel groups adjacent to, or facing, a corresponding fourth stretch detection circuit among the plurality of fourth stretch detection circuits in which the stretch is detected based on the fourth delay time; and estimate a coordinate range in which the stretch has occurred based on at least one of the first location coordinates, the second location coordinates, the third location coordinates, and the fourth location coordinates.

11. The stretchable display device of claim 5, wherein the plurality of first pixel groups and the plurality of second pixel groups comprise the same number of pixel groups.

12. The stretchable display device of claim 5, wherein the plurality of first pixel groups and the plurality of second pixel groups comprise different numbers of pixel groups.

13. The stretchable display device of claim 3, wherein:

the plurality of first stretch detection circuits are configured respectively to correspond to the plurality of first pixel groups divided on a source drive integrated circuit basis in the first direction, and receive an input signal from the data driving circuit and output an output signal through a predetermined number of capacitors and a predetermined number of resistors in response to the input signal; and the plurality of second stretch detection circuits are configured respectively to correspond to the plurality of second pixel groups divided on a gate drive integrated circuit basis in the second direction, and receive an input signal from the data driving circuit and output an output signal through a predetermined number of capacitors and a predetermined number of resistors in response to the input signal.

14. A stretchable panel driving circuit configured to drive a stretchable display panel, the stretchable panel driving circuit comprising:

at least one stretch detection circuit group comprising at least one delay cell and at least one stretch variable capacitor disposed in a non-display area of the stretchable display panel, and configured to detect a delay time caused by a stretch of the stretchable display panel;

a compensation control signal generating circuit configured to generate a compensation control signal based on the delay time; and a driving circuit configured to generate a compensated signal based on the compensation control signal.

15. The stretchable panel driving circuit of claim 14, wherein the at least one stretch detection circuit group comprises:

a first stretch detection circuit group comprising at least one first delay cell and at least one first stretch variable capacitor disposed in a first direction in the non-display area, and configured to detect a first delay time caused by a stretch; and a second stretch detection circuit group comprising at least one second delay cell disposed in a second direction intersecting the first direction in the non-display area and at least one second stretch variable capacitor, and configured to detect a second delay time caused by the stretch.

16. The stretchable panel driving circuit of claim 15, wherein the first stretch detection circuit group is configured to detect a first delay time that is an output signal output by the first stretch detection circuit group due to the stretch, and the second stretch detection circuit group is configured to detect a second delay time that is an output signal output by the second stretch detection circuit group due to the stretch.

17. The stretchable panel driving circuit of claim 15, wherein:

the first stretch detection circuit group comprises a plurality of first stretch detection circuits respectively corresponding to a plurality of first pixel groups divided on a plurality of pixels basis in the first direction; and each of the plurality of first stretch detection circuits comprises at least one first delay cell and at least one first stretch variable capacitor, which are configured to receive a first input signal corresponding to a respective one of the plurality of first pixel groups and output an output signal in response to the first input signal.

18. The stretchable panel driving circuit of claim 17, wherein:

the second stretch detection circuit group comprises a plurality of second stretch detection circuits respectively corresponding to a plurality of second pixel groups divided on a plurality of pixels basis in the second direction; and each of the plurality of second stretch detection circuits comprises at least one second delay cell and at least one second stretch variable capacitor, which are configured to receive a second input signal corresponding to a respective one of the plurality of second pixel groups and output an output signal in response to the second input signal.

19. The stretchable panel driving circuit of claim 18, further comprising a stretch occurrence location estimating circuit configured to:

detect first location coordinates comprising information on rows and columns of a corresponding first pixel group in which a stretch is detected based on the first delay time;

detect second location coordinates comprising information for rows and columns of a corresponding second pixel group in which the stretch is detected based on the second delay time; and estimate a coordinate range in which the stretch has occurred based on the detected first location coordinates and the detected second location coordinates.

20. The stretchable panel driving circuit of claim 18, wherein the compensation control signal generating circuit is configured to:

determine a stretch degree of each of the plurality of first pixel groups based on a change in the first delay time; and determine a stretch degree of each of the plurality of second pixel groups based on a change in the second delay time.

* * * * *